United States Patent
Panse et al.

(10) Patent No.: US 11,991,187 B2
(45) Date of Patent: May 21, 2024

(54) SECURITY THREAT DETECTION BASED ON NETWORK FLOW ANALYSIS

(71) Applicant: VMware LLC, Palo Alto, CA (US)

(72) Inventors: Tejas Sanjeev Panse, San Jose, CA (US); Santhanakrishnan Kaliya Perumal, Cupertino, CA (US); Aditi Vutukuri, Atlanta, GA (US); Margaret Petrus, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 187 days.

(21) Appl. No.: 17/220,553

(22) Filed: Apr. 1, 2021

(65) Prior Publication Data

US 2022/0239675 A1 Jul. 28, 2022

Related U.S. Application Data

(60) Provisional application No. 63/140,680, filed on Jan. 22, 2021.

(51) Int. Cl.
*H04L 29/06* (2006.01)
*H04L 9/40* (2022.01)

(52) U.S. Cl.
CPC ...... *H04L 63/1416* (2013.01); *H04L 63/1425* (2013.01)

(58) Field of Classification Search
CPC .............. H04L 63/1416; H04L 63/1425; H04L 63/1475; H04L 43/026; H04L 43/106;
(Continued)

(56) References Cited

U.S. PATENT DOCUMENTS

| 5,636,128 A | 6/1997 | Sugimoto et al. |
| 7,027,411 B1 | 4/2006 | Pulsipher et al. |

(Continued)

FOREIGN PATENT DOCUMENTS

| EP | 3716075 A1 | 9/2020 |
| EP | 3767553 A1 | 1/2021 |

(Continued)

OTHER PUBLICATIONS

Abbes, Tarek, et al., "Detection of Firewall Configuration Errors with Updatable Tree," International Journal of Information Security, May 2015, 17 pages, vol. 15, No. 3, Springer Verlag.

(Continued)

*Primary Examiner* — Muhammad Raza
(74) *Attorney, Agent, or Firm* — Quarles & Brady LLP

(57) ABSTRACT

Some embodiments provide a method for identifying security threats to a datacenter. From multiple host computers in the datacenter, the method receives attribute sets for multiple flows. Each respective attribute set for a respective flow includes at least (i) a source identifier for the respective flow and (ii) an indicator as to whether the respective flow is indicative of the source of the respective flow being a security threat. For each of multiple source identifiers, the method aggregates the received attribute sets to generate an aggregate attribute set for the source identifier that includes a combined measurement of security threat indicators. For a particular source identifier, the method adjusts a security threat likelihood score for the source corresponding to the particular source identifier based on the combined measurement of security threat indicators for the source identifier.

22 Claims, 12 Drawing Sheets

(58) Field of Classification Search
CPC .. H04L 63/1458; H04L 63/1433; H04L 63/00;
G06F 2221/2101; G06F 9/5077
See application file for complete search history.

(56) References Cited

U.S. PATENT DOCUMENTS

| | | | |
|---|---|---|---|
| 7,065,079 B1 | 6/2006 | Patra et al. | |
| 7,580,356 B1 | 8/2009 | Mishra et al. | |
| 7,739,211 B2 | 6/2010 | Coffman et al. | |
| 7,908,655 B1* | 3/2011 | Bhattacharyya | H04L 63/1475 |
| | | | 370/396 |
| 8,005,945 B2 | 8/2011 | Cohen et al. | |
| 8,359,652 B2 | 1/2013 | Bhagwan et al. | |
| 8,495,429 B2 | 7/2013 | Fu et al. | |
| 8,605,655 B1 | 12/2013 | Sahai et al. | |
| 8,762,957 B2 | 6/2014 | Cobb et al. | |
| 9,215,213 B2 | 12/2015 | Bansal et al. | |
| 9,218,527 B2 | 12/2015 | Akshminarayan et al. | |
| 9,223,767 B1 | 12/2015 | Powell et al. | |
| 9,438,560 B2 | 9/2016 | Mohanty et al. | |
| 9,438,634 B1 | 9/2016 | Ross et al. | |
| 9,454,444 B1 | 9/2016 | Agarwal et al. | |
| 9,467,476 B1 | 10/2016 | Shieh et al. | |
| 9,497,206 B2 | 11/2016 | Bernstein et al. | |
| 9,578,050 B1 | 2/2017 | Barabash et al. | |
| 9,680,877 B2 | 6/2017 | Duffield et al. | |
| 9,699,049 B2 | 7/2017 | Gupta et al. | |
| 9,767,197 B1 | 9/2017 | Agarwal et al. | |
| 9,787,641 B2 | 10/2017 | Bansal et al. | |
| 9,792,447 B2 | 10/2017 | Thota et al. | |
| 9,882,713 B1 | 1/2018 | Raza et al. | |
| 9,891,940 B2 | 2/2018 | Feroz et al. | |
| 9,998,339 B1 | 6/2018 | Brajkovic et al. | |
| 10,129,162 B1 | 11/2018 | Faulk, Jr. | |
| 10,257,227 B1 | 4/2019 | Stickle et al. | |
| 10,298,505 B1 | 5/2019 | Grant et al. | |
| 10,298,619 B2 | 5/2019 | Nimmagadda et al. | |
| 10,324,746 B2 | 6/2019 | Kumar et al. | |
| 10,419,321 B2 | 9/2019 | Raman et al. | |
| 10,425,437 B1 | 9/2019 | Bog et al. | |
| 10,432,707 B2 | 10/2019 | Hosie et al. | |
| 10,521,584 B1 | 12/2019 | Mehr | |
| 10,735,282 B1 | 8/2020 | Singh et al. | |
| 10,812,409 B2 | 10/2020 | Tiwary et al. | |
| 10,911,335 B1 | 2/2021 | Mordani et al. | |
| 11,057,414 B1 | 7/2021 | Giorgio et al. | |
| 11,140,090 B2 | 10/2021 | Mordani et al. | |
| 11,176,157 B2 | 11/2021 | Mordani et al. | |
| 11,188,570 B2 | 11/2021 | Jain et al. | |
| 11,288,256 B2 | 3/2022 | Jain et al. | |
| 11,296,960 B2 | 4/2022 | Wang et al. | |
| 11,321,213 B2 | 5/2022 | Gunda et al. | |
| 11,340,931 B2 | 5/2022 | Krishna et al. | |
| 11,343,262 B2 | 5/2022 | Junod et al. | |
| 11,347,896 B1 | 5/2022 | Brown, Jr. et al. | |
| 11,349,876 B2 | 5/2022 | Krishna et al. | |
| 11,398,987 B2 | 7/2022 | Jain et al. | |
| 11,436,075 B2 | 9/2022 | Jain et al. | |
| 11,616,708 B1 | 3/2023 | Chraim et al. | |
| 2003/0120955 A1 | 6/2003 | Bartal et al. | |
| 2003/0236677 A1 | 12/2003 | Casati et al. | |
| 2004/0190724 A1 | 9/2004 | Dettinger et al. | |
| 2005/0108444 A1 | 5/2005 | Flauaus et al. | |
| 2005/0119001 A1 | 6/2005 | Watanabe | |
| 2005/0262554 A1 | 11/2005 | Brooks et al. | |
| 2005/0289219 A1 | 12/2005 | Nazzal | |
| 2006/0085785 A1 | 4/2006 | Garrett | |
| 2006/0168657 A1 | 7/2006 | Baentsch et al. | |
| 2006/0174337 A1 | 8/2006 | Bernoth | |
| 2006/0239203 A1 | 10/2006 | Talpade et al. | |
| 2007/0011734 A1 | 1/2007 | Balakrishnan et al. | |
| 2007/0016666 A1 | 1/2007 | Duffield et al. | |
| 2007/0044155 A1* | 2/2007 | Pletka | H04L 63/08 |
| | | | 726/25 |
| 2007/0058632 A1 | 3/2007 | Back et al. | |
| 2007/0147236 A1 | 6/2007 | Lee | |
| 2008/0037423 A1 | 2/2008 | Singh et al. | |
| 2008/0059596 A1 | 3/2008 | Ogawa | |
| 2008/0196102 A1 | 8/2008 | Roesch | |
| 2008/0196103 A1 | 8/2008 | Lin et al. | |
| 2008/0263666 A1* | 10/2008 | Keohane | H04L 63/126 |
| | | | 726/23 |
| 2008/0267186 A1 | 10/2008 | Boukis et al. | |
| 2008/0281660 A1 | 11/2008 | Sajja et al. | |
| 2008/0282335 A1 | 11/2008 | Abzarian et al. | |
| 2009/0077663 A1 | 3/2009 | Sun et al. | |
| 2009/0106228 A1 | 4/2009 | Weinman, Jr. | |
| 2009/0300341 A1 | 12/2009 | Buehler et al. | |
| 2010/0049968 A1 | 2/2010 | Dimitrakos et al. | |
| 2010/0106764 A1 | 4/2010 | Chadwick et al. | |
| 2010/0107085 A1 | 4/2010 | Chadwick et al. | |
| 2010/0153316 A1 | 6/2010 | Duffield et al. | |
| 2010/0211673 A1 | 8/2010 | Kosbab et al. | |
| 2010/0241480 A1 | 9/2010 | Rokhlin et al. | |
| 2010/0309812 A1 | 12/2010 | Marquez et al. | |
| 2010/0325199 A1 | 12/2010 | Park et al. | |
| 2010/0332262 A1 | 12/2010 | Horvitz et al. | |
| 2011/0082962 A1 | 4/2011 | Horovitz et al. | |
| 2011/0162039 A1 | 6/2011 | Trace et al. | |
| 2011/0170413 A1 | 7/2011 | Shi et al. | |
| 2012/0131591 A1 | 5/2012 | Moorthi et al. | |
| 2012/0226808 A1 | 9/2012 | Morgan | |
| 2012/0266231 A1 | 10/2012 | Spiers et al. | |
| 2013/0041522 A1 | 2/2013 | Mori et al. | |
| 2013/0067090 A1 | 3/2013 | Batrouni et al. | |
| 2013/0085914 A1 | 4/2013 | Mcpherson et al. | |
| 2013/0117567 A1 | 5/2013 | Chang et al. | |
| 2013/0124753 A1 | 5/2013 | Ansari et al. | |
| 2013/0185413 A1 | 7/2013 | Beaty et al. | |
| 2013/0198459 A1 | 8/2013 | Joshi et al. | |
| 2013/0212255 A1 | 8/2013 | Chao et al. | |
| 2013/0227687 A1 | 8/2013 | Lee | |
| 2013/0254766 A1 | 9/2013 | Zuo et al. | |
| 2013/0297768 A1 | 11/2013 | Singh | |
| 2014/0019964 A1 | 1/2014 | Neuse et al. | |
| 2014/0089506 A1 | 3/2014 | Naga et al. | |
| 2014/0207918 A1 | 7/2014 | Kowalski et al. | |
| 2014/0230008 A1 | 8/2014 | Feroz et al. | |
| 2014/0245423 A1 | 8/2014 | Lee | |
| 2014/0282591 A1 | 9/2014 | Stich et al. | |
| 2014/0310513 A1 | 10/2014 | Barney et al. | |
| 2015/0113529 A1 | 4/2015 | Zhong | |
| 2015/0124608 A1 | 5/2015 | Agarwal et al. | |
| 2015/0135003 A1 | 5/2015 | Cota-Robles et al. | |
| 2015/0180892 A1 | 6/2015 | Balderas | |
| 2015/0181394 A1 | 6/2015 | Zuniga et al. | |
| 2015/0281056 A1 | 10/2015 | Liljenstolpe | |
| 2015/0281065 A1 | 10/2015 | Liljenstolpe | |
| 2015/0286783 A1 | 10/2015 | Kumar et al. | |
| 2015/0304349 A1 | 10/2015 | Bernstein et al. | |
| 2015/0358391 A1 | 12/2015 | Moon et al. | |
| 2016/0050589 A1 | 2/2016 | Safavi | |
| 2016/0080404 A1 | 3/2016 | Kohout et al. | |
| 2016/0087847 A1 | 3/2016 | Krithivas et al. | |
| 2016/0087859 A1 | 3/2016 | Kuan et al. | |
| 2016/0127390 A1* | 5/2016 | Lai | H04L 63/1416 |
| | | | 726/23 |
| 2016/0156591 A1 | 6/2016 | Zhou et al. | |
| 2016/0191306 A1 | 6/2016 | Gasparakis et al. | |
| 2016/0191413 A1 | 6/2016 | Feroz et al. | |
| 2016/0191463 A1 | 6/2016 | Mohanty et al. | |
| 2016/0191521 A1 | 6/2016 | Feroz et al. | |
| 2016/0216994 A1 | 7/2016 | Sefidcon et al. | |
| 2016/0218951 A1 | 7/2016 | Vasseur et al. | |
| 2016/0294800 A1 | 10/2016 | Oppenheim, Jr. et al. | |
| 2016/0294987 A1 | 10/2016 | Tian et al. | |
| 2016/0301603 A1 | 10/2016 | Park et al. | |
| 2016/0350683 A1 | 12/2016 | Bester et al. | |
| 2016/0359759 A1 | 12/2016 | Singh et al. | |
| 2016/0380812 A1 | 12/2016 | Chanda et al. | |
| 2016/0380884 A1 | 12/2016 | Sarikaya et al. | |
| 2017/0005986 A1 | 1/2017 | Bansal et al. | |
| 2017/0078168 A1 | 3/2017 | Harris et al. | |
| 2017/0126677 A1 | 5/2017 | Kumar et al. | |

(56) References Cited

U.S. PATENT DOCUMENTS

| | | |
|---|---|---|
| 2017/0134247 A1 | 5/2017 | Hoja et al. |
| 2017/0207968 A1 | 7/2017 | Eicken et al. |
| 2017/0212799 A1 | 7/2017 | Konireddygari |
| 2017/0214634 A1 | 7/2017 | Li |
| 2017/0279687 A1 | 9/2017 | Muntés-Mulero et al. |
| 2017/0293994 A1 | 10/2017 | Li et al. |
| 2017/0324632 A1 | 11/2017 | Arora |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0063164 A1 | 3/2018 | Balasubramanian et al. |
| 2018/0077119 A1 | 3/2018 | Fields et al. |
| 2018/0077120 A1 | 3/2018 | Baughman et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0101371 A1 | 4/2018 | Flanakin et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2018/0181423 A1 | 6/2018 | Gunda et al. |
| 2018/0181754 A1 | 6/2018 | Gunda |
| 2018/0183757 A1 | 6/2018 | Gunda et al. |
| 2018/0234333 A1 | 8/2018 | Inamdar et al. |
| 2018/0248904 A1 | 8/2018 | Villella et al. |
| 2018/0270189 A1 | 9/2018 | Montenot et al. |
| 2018/0270308 A1 | 9/2018 | Shea et al. |
| 2018/0287876 A1 | 10/2018 | Strobel et al. |
| 2018/0288063 A1 | 10/2018 | Koottayi et al. |
| 2018/0316704 A1 | 11/2018 | Durairaj et al. |
| 2018/0324199 A1 | 11/2018 | Crotinger et al. |
| 2019/0007292 A1 | 1/2019 | Nevo et al. |
| 2019/0075056 A1 | 3/2019 | Lu et al. |
| 2019/0158520 A1 | 5/2019 | DiValentin et al. |
| 2019/0163900 A1* | 5/2019 | Zhang .................. G06N 20/00 |
| 2019/0166008 A1 | 5/2019 | Gintis et al. |
| 2019/0171474 A1 | 6/2019 | Malboubi et al. |
| 2019/0180141 A1 | 6/2019 | Tiagi et al. |
| 2019/0182276 A1 | 6/2019 | Tiagi et al. |
| 2019/0182281 A1 | 6/2019 | Neil et al. |
| 2019/0199599 A1 | 6/2019 | Zavesky et al. |
| 2019/0266004 A1 | 8/2019 | Kumar et al. |
| 2019/0280949 A1 | 9/2019 | Wang et al. |
| 2019/0303562 A1 | 10/2019 | Masputra et al. |
| 2019/0319863 A1 | 10/2019 | Gupta et al. |
| 2019/0342335 A1 | 11/2019 | Ni et al. |
| 2019/0373007 A1 | 12/2019 | Salunke et al. |
| 2019/0373052 A1 | 12/2019 | Pollitt et al. |
| 2019/0379612 A1 | 12/2019 | Tiwary et al. |
| 2019/0392329 A1 | 12/2019 | Rangarajan et al. |
| 2020/0028756 A1 | 1/2020 | Hale et al. |
| 2020/0059480 A1* | 2/2020 | Junod ................. H04L 63/1425 |
| 2020/0084087 A1 | 3/2020 | Sharma et al. |
| 2020/0100145 A1 | 3/2020 | Enqvist et al. |
| 2020/0162407 A1 | 5/2020 | Tillotson |
| 2020/0167258 A1 | 5/2020 | Chattopadhyay et al. |
| 2020/0167784 A1 | 5/2020 | Kursun |
| 2020/0183947 A1 | 6/2020 | Reeve et al. |
| 2020/0210260 A1 | 7/2020 | Prabhakar et al. |
| 2020/0244675 A1* | 7/2020 | Meshi ..................... H04L 63/00 |
| 2020/0244676 A1 | 7/2020 | Amit et al. |
| 2020/0310884 A1 | 10/2020 | Villalobos et al. |
| 2020/0396075 A1 | 12/2020 | Visegrady et al. |
| 2020/0396254 A1 | 12/2020 | Crabtree et al. |
| 2021/0006642 A1 | 1/2021 | He et al. |
| 2021/0026677 A1 | 1/2021 | Krishna et al. |
| 2021/0026720 A1 | 1/2021 | Jain et al. |
| 2021/0026830 A1 | 1/2021 | Jain et al. |
| 2021/0026863 A1 | 1/2021 | Mordani et al. |
| 2021/0026870 A1 | 1/2021 | Jain et al. |
| 2021/0028996 A1 | 1/2021 | Mordani et al. |
| 2021/0029002 A1 | 1/2021 | Mordani et al. |
| 2021/0029050 A1 | 1/2021 | Jain et al. |
| 2021/0029051 A1 | 1/2021 | Mordani et al. |
| 2021/0029166 A1 | 1/2021 | Krishna et al. |
| 2021/0075789 A1 | 3/2021 | Wen et al. |
| 2021/0084074 A1* | 3/2021 | Kirner ................. H04L 63/0209 |
| 2021/0099473 A1 | 4/2021 | Fainberg et al. |
| 2021/0110407 A1 | 4/2021 | Albero et al. |
| 2021/0185073 A1 | 6/2021 | Ewaida et al. |
| 2021/0203684 A1 | 7/2021 | Maor et al. |
| 2021/0224179 A1 | 7/2021 | Gunda et al. |
| 2021/0281591 A1 | 9/2021 | Furtak |
| 2021/0344689 A1* | 11/2021 | Sharifi Mehr ...... H04L 63/1425 |
| 2022/0239683 A1 | 7/2022 | Kaliya et al. |
| 2022/0261330 A1 | 8/2022 | Gunda et al. |
| 2022/0269577 A1 | 8/2022 | Gechman et al. |
| 2022/0365806 A1 | 11/2022 | Krishna et al. |
| 2022/0417096 A1 | 12/2022 | Vutukuri et al. |
| 2023/0011043 A1 | 1/2023 | Panse et al. |
| 2023/0011397 A1 | 1/2023 | Panse et al. |
| 2023/0011957 A1 | 1/2023 | Panse et al. |

FOREIGN PATENT DOCUMENTS

| | | |
|---|---|---|
| WO | 2006091175 A1 | 8/2006 |
| WO | 2016003262 A1 | 1/2016 |

OTHER PUBLICATIONS

Oliveira, Ricardo M., et al., "Automatic Detection of Firewall Misconfigurations Using Firewall and Network Routing Policies," Jan. 2009, 6 pages.

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Non-Published Commonly Owned Related U.S. Appl. No. 17/220,550 with similar specification, filed Apr. 1, 2021, 54 pages, VMware, Inc.

Ring, Markus, et al., "Detection of Slow Port Scans in Flow-Based Network Traffic," Plos One, Sep. 25, 2018, 18 pages, retrieved from https://journals.plos.org/plosone/article?id=10.1371/journal.pone.0204507.

Turcotte, Melissa J. M., et al., "Unified Host and Network Data Set", Aug. 24, 2017, 16 pages, arXiv:1708.07518v1, arXiv.org, Cornell University, Ithaca, NY, USA.

Waye, Lucas, et al., "Cryptographically Secure Information Flow Control on Key-Value Stores," CCS '17: Proceedings of the 2017 ACM SIGSAC Conference on Computer and Communications Security, Oct. 30-Nov. 3, 2017, 15 pages, ACM, Dallas, TX, USA.

Arbuthnot, Tom, "What are Thresholds for Good and Poor Network Packet Loss, Jitter and Round Trip Time for Unified Communications?", Tom Talks, May 17, 2018, 7 pages, retrieved from https://tomtalks.blog/what-are-thresholds-for-good-and-poor-network-packet-loss-jitter-and-round-trip-time-for-unified-communications/.

* cited by examiner

|  | Window T0 | | Window T1 | | Window T2 | | Window T3 | | Window T4 | |
| --- | --- | --- | --- | --- | --- | --- | --- | --- | --- | --- |
|  | Total Scan Indicators | Score | Total Scan Indicators | Score | Total Scan Indicators | Score | Total Scan Indicators | Score | Total Scan Indicators | Score |
| Source VM | 0 | 0.25 | 0 | 0.0625 | 2 | 0.5 | 0 | 0.125 | 0 | 0.03125 |
| Source Scanner | 1 | 4 | 1 | 32 | No Flows | | 4 | 512 | 2 | *4096* |

*Figure 5*

SECURITY THREAT DETECTION BASED ON NETWORK FLOW ANALYSIS

BACKGROUND

Datacenter networks today are a complex mix of entities including diverse networks, services, users, and resources. Discovering vulnerable entities that can act as entry points to a protected network is typically the first phase of an attack. One popular technique used by attackers is port scanning, which can enable the attacker to discover services that can be broken into, as a precursor to a larger intrusive attack on a datacenter. There is ongoing research in the field of port scan detection, while at the same time attackers are devising better techniques to evade detection by the state-of-the-art detection systems. For instance, some attackers time the scans in order to stay under the radar of most statistically based detection schemes (e.g., only checking a single port per day)

To detect and report port scans in a datacenter is difficult in light of the amount of data that needs to be processed. For instance, an intrusion detection system detecting port scans based on packet or data flow inspection typically needs to process all of the packets or flows generated by all of the VMs, containers, etc. in a datacenter. Many datacenters host services made available to external users, so the number of such flows is basically unlimited. Existing port scan detection tools typically lack native support from the hypervisors in a datacenter. Some tools use custom agents that run in VMs which feed data packet information to a central processing engine for additional processing, which makes real-time detection difficult. As such, better techniques for detecting port scans in a datacenter are required.

BRIEF SUMMARY

Some embodiments provide novel techniques for identifying security threats to a datacenter (e.g., different types of port scans). Some such embodiments leverage a data flow collection system for the datacenter that collects and reports attributes of data flows associated with data compute nodes (DCNs) executing on host computers in the datacenter. Agents on the host computers (e.g., executing in virtualization software of the host computers) collect and export data flow information for the DCNs executing on the host computers to an analysis appliance (e.g., a single server or cluster of servers) that, among other analysis tasks, processes the data flow information to identify security threats such as port scans. The analysis appliance of some embodiments also either reports the security threats or provides the security threat data to other elements of the system to report the security threats (e.g., to network administrators).

In some embodiments, the agent (e.g., a flow exporter agent) on each host computer collects attributes of data message flows initiated with the DCNs executing on that host computer (e.g., flows initiated by source clients with the DCN as the server) and exports these flow attributes to the centralized analysis appliance. These flow attributes, in some embodiments, include at least the source network address (e.g., IP address), destination network address, destination transport layer port, and transport layer protocol. In addition, some embodiments include the number of connection errors detected for the flow, which can be used as evidence of port scanning. These connection errors may include, for example, incomplete transmission control protocol (TCP) handshakes (for TCP flows) or internet control message protocol (ICMP) error messages (for user datagram protocol (UDP) flows).

In different embodiments, the analysis appliance uses these flow attributes to detect (i) sources that attempt to identify open ports on many DCNs in the datacenter (e.g., using a slow port scan) and/or (ii) sources that perform vertical port scans in an attempt to find open ports to attack on a specific DCN. Some embodiments use different analyses to identify these two different types of port scanning attack. In some embodiments, the detection of the first type of source (that performs a slow port scan) involves collectively analyzing data received from many host computers in the datacenter, while the detection of the second type of source (that performs a vertical port scan) involves analyzing data received from individual host computers in the datacenter.

To identify sources that pose a security threat from a slow port scan, some embodiments aggregate the flow attribute sets received from the host computers in the datacenter based on source identifiers (e.g., source network address) in the attribute sets. The aggregated attribute sets for each source, in some embodiments, include the source identifier for the source and a combined measurement of security threat indicators for the source. As mentioned, the flow attribute sets in some embodiments include the number of connection errors detected for the flow, which can be used as security threat indicators. In some embodiments, the aggregated attribute set specifies the number of flows from a particular source that include at least one connection error (rather than the total number of connection errors, to avoid punishing sources that have been misconfigured and repeatedly attempt to access the same incorrect port on a datacenter DCN).

The slow port scan detection process of some embodiments uses these combined measurements from the aggregated attribute sets to adjust security threat likelihood scores for each of the sources. These scores measure the likelihood that their corresponding source poses a security threat (i.e., the likelihood that the source is a port scanner). Specifically, some embodiments batch process the flow attribute sets by generating the combined measurement of threat indicators at regular intervals (or non-regular intervals), then updating the scores for each source after each interval. In some embodiments, once the score for a source crosses a first threshold, the source is classified as a threat. If instead the source crosses a second threshold (e.g., in the opposite direction to the first threshold), the source is classified as safe. By storing only a single score for each source (rather than information for every flow for an extended time period), the network analysis system saves memory. In order to further save memory, some embodiments stop tracking sources once they have been classified as either safe or threats (i.e., only sources with scores in between the safe/threat thresholds are updated regularly.

To adjust the security score for a source after a time interval, some embodiments use different equations depending on whether the aggregated attribute set for the source includes any threat indicators (e.g., connection errors) for the interval. Both of these equations, in some embodiments, use (i) a first probability that a network event is successful (i.e., a flow initiation will not result in a connection error) if a source is a port scanner and (ii) a second probability that a network event is successful if a source is not a port scanner. Specifically, when there are no connection errors for a source over the time interval, the updated score is equal to the previous score multiplied by the ratio of the first probability to the second probability. When there is at least one connection error for the source over the time interval, the updated score is equal to the previous score multiplied by the number of flows from the source with connection errors during the time interval multiplied by the ratio of the probability that a network event is unsuccessful if a source is a port scanner (i.e., 1 minus the first probability) to the probability that a network event is unsuccessful if a source is not a port scanner (i.e., 1 minus the second probability). The ratio in the first equation should be less than 1, while the ratio in the second equation should be greater than 1, assuming that flows are more likely to have errors when sent by a port scanner.

Some embodiments apply additional rigor to the analysis in order to reduce the likelihood of false positive identifications of slow port scans. Specifically, some embodiments discard certain connection errors that are not necessarily indicative of a port scan. For instance, if a source DCN is misconfigured or if a destination service in the datacenter goes down, these may cause connection errors that are not the result of a port scanner.

To handle the latter issue, some embodiments discard connection errors for which the destination port is a port known to be open on the destination DCN being contacted. Such errors could be the result of a network glitch, the service listening on that port on the destination DCN being down temporarily, etc. (though the errors could also be the result of a port scanner initiating a flow). While in theory a network administrator could provide the list of all open ports (and allowed protocols for each port) on each DCN in a datacenter, for a large datacenter this would be a difficult and time-consuming task. Instead, some embodiments use the analysis of flow attribute sets by the network analysis appliance to identify the open ports for each DCN. Some such embodiments also interface with a compute management system to retrieve information about the services executing on each DCN to enhance the list of open ports.

To avoid penalizing misconfigured source DCNs some embodiments avoid repeatedly (i.e., at multiple time intervals) counting connection errors for flows from the same source to the same port on the same destination DCN. While this could easily be done by tracking all flows with connection errors for all sources, doing so would quickly use far too much memory. Instead, some embodiments use a hash-based probabilistic filter that removes from analysis the majority of flows with connection errors that have previously been accounted for. Such a filter, in some embodiments, includes (i) a least-recently-used (LRU) cache with an upper limit on memory use and (ii) a probabilistic filter (e.g., a bloom filter, cuckoo filter, etc.) for entries that have to be removed from the LRU cache.

As mentioned, to detect vertical port scans, the analysis appliance of some embodiments analyzes data received from individual host computers in the datacenter (i.e., to determine whether a particular DCN is the target of such a scan). Such vertical port scans often use spoofed network addresses or otherwise change the source network address, so analyzing based on the source address is not a fruitful method of detection. Instead, this analysis looks at the port usage over a particular time period (e.g., one day) for each DCN to determine whether that port usage deviates from a historical baseline port usage (e.g., over the previous 30 days) for that DCN in a way that is indicative of the DCN being targeted by a vertical port scan.

In some embodiments, the analysis appliance performs a multi-step process for each destination DCN. In some embodiments, the appliance first determines for a given DCN (i) whether the number of ports used at the DCN during the analyzed time period (i.e., unique port numbers that showed up as destination ports for flows during the time period) is greater than the typical baseline number of ports and (ii) if so, whether the deviation is greater than a standard deviation computed for port usage at the DCN over the baseline time period.

If the deviation in port usage passes these metrics, the analysis appliance of some embodiments computes a score to better measure the deviation that accounts for additional contextual factors beyond just the total number of different ports used. In some embodiments, this score aggregates multiple factors with different adjustable weights. That is, the score is a weighted sum of the different factors. These factors can include the number of ports used above the historical baseline (i.e., the absolute or relative deviation from the baseline), the usage of unique ports that were not used during previous time periods, and the number of connection errors detected for flows sent to the particular DCN (or the number of connection errors per port used). The weights, which specify the relative importance of the different factors, can be set by the network administrator. In addition, the analysis appliance can modify the weights in some embodiments based on feedback (e.g., from the network administrator). For instance, if the analysis identifies a DCN targeted by a port scan and the administrator affirms this conclusion, then the weights might be modified so that the inputs would generate a higher score. Similarly, if an administrator dismisses a threat, then the weights might be modified so that the inputs would generate a lower score.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 5 illustrates how the security threat likelihood scores for two different sources are changed over several time windows depending on the number of connection errors identified in each time window.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel techniques for identifying security threats to a datacenter (e.g., different types of port scans). Some such embodiments leverage a data flow collection system for the datacenter that collects and reports attributes of data flows associated with data compute nodes (DCNs) executing on host computers in the datacenter. Agents on the host computers (e.g., executing in virtualization software of the host computers) collect and export data flow information for the DCNs executing on the host computers to an analysis appliance (e.g., a single server or cluster of servers) that, among other analysis tasks, processes the data flow information to identify security threats such as port scans. The analysis appliance of some embodiments also either reports the security threats or provides the security threat data to other elements of the system to report the security threats (e.g., to network administrators).

In some embodiments, the agent (e.g., a flow exporter agent) on each host computer collects attributes of data message flows initiated with the DCNs executing on that host computer (e.g., flows initiated by source clients with the DCN as the server) and exports these flow attributes to the centralized analysis appliance. These flow attributes, in some embodiments, include at least the source network address (e.g., IP address), destination network address, destination transport layer port, and transport layer protocol. In addition, some embodiments include the number of connection errors detected for the flow, which can be used as evidence of port scanning. These connection errors may include, for example, incomplete transmission control protocol (TCP) handshakes (for TCP flows) or internet control message protocol (ICMP) error messages (for user datagram protocol (UDP) flows).

In different embodiments, the analysis appliance uses these flow attributes to detect (i) sources that attempt to identify open ports on many DCNs in the datacenter (e.g., using a slow port scan) and/or (ii) sources that perform vertical port scans in an attempt to find open ports to attack on a specific DCN. Some embodiments use different analyses to identify these two different types of port scanning attack. In some embodiments, the detection of the first type of source (that performs a slow port scan) involves collectively analyzing data received from many host computers in the datacenter, while the detection of the second type of source (that performs a vertical port scan) involves analyzing data received from individual host computers in the datacenter.

Figure 1:
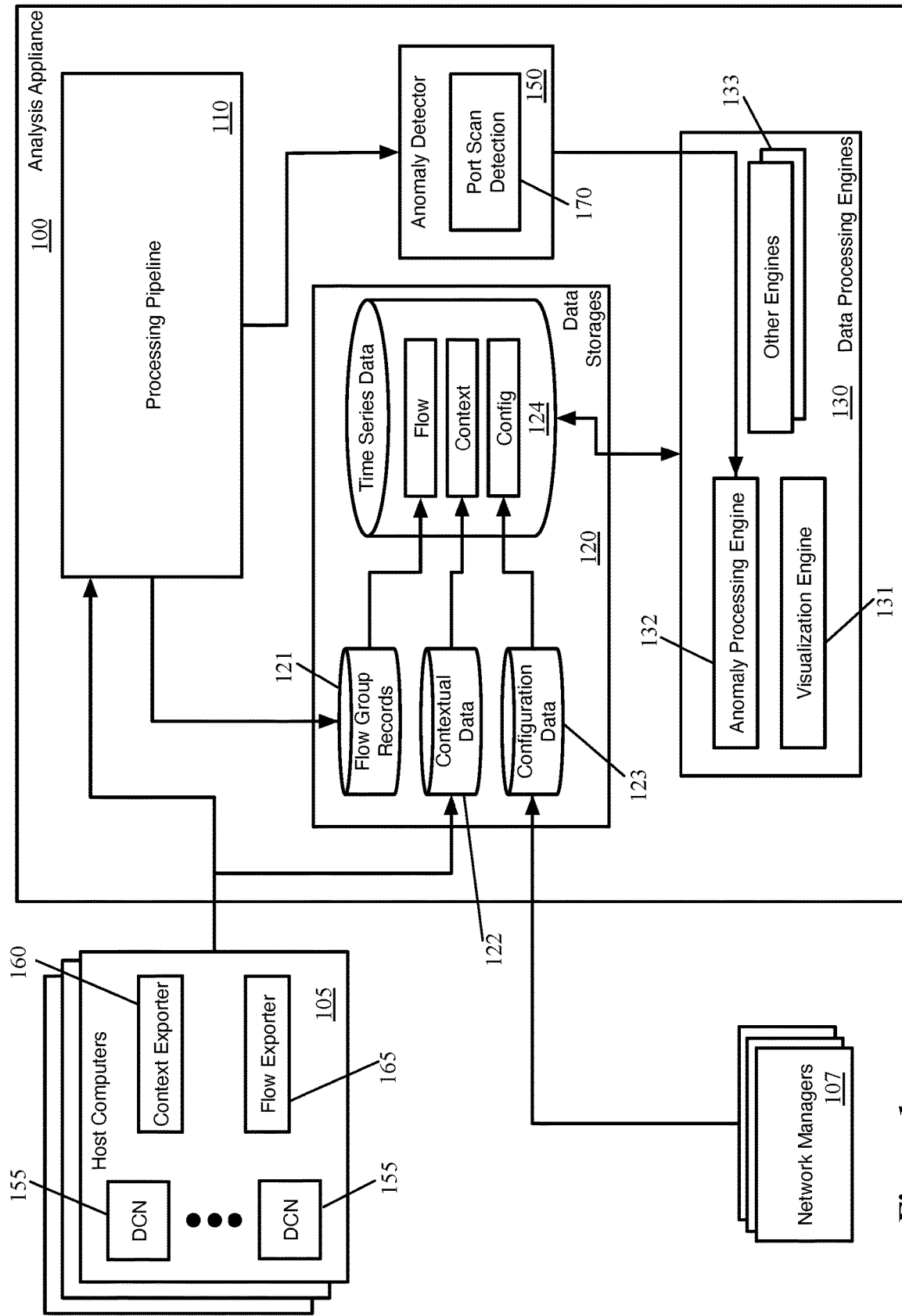
FIG. 1 conceptually illustrates the analysis appliance 100 of some embodiments.

FIG. 1 conceptually illustrates the analysis appliance 100 of some embodiments, as well as the network managers 107 and host computers 105. The analysis appliance 100 includes a processing pipeline 110 for flow data (e.g., flow attribute sets received from host computers), a set of data storages 120 for storing received data, an anomaly detector 150 for performing regular anomaly detection on incoming flow data from the processing pipeline 110, and a set of data processing engines 130 (e.g., a visualization engine 131, an anomaly processing engine 132, and other engines 133).

The host computers 105 will be described in greater detail below by reference to FIG. 2. As shown, these host computers execute one or more DCNs 155 (e.g., virtual machines (VMs), containers, etc.) that can run services, applications, etc. These DCNs 155 send and receive data traffic, which are organized as data message flows. Each host computer 105 also executes (e.g., within virtualization software) a context exporter 160 and a flow exporter 165, which are associated with the analysis appliance 100. The context exporter 160 collects context data regarding the DCNs 155 and provides this data to the analysis appliance 100. The flow exporter 165 collects information about data flows to and from the DCNs 155 and provides this data to the analysis appliance 100.

The network managers 107 provide configuration data to the analysis appliance 100, including management plane configuration data and policy configuration data. In addition, the analysis appliance 100 communicates control messages (e.g., updates to service rule policies, updated keys, updated group memberships validated by a user, etc.) through the network managers 107. In some embodiments, a user (e.g., an administrator, not shown) can interact with the analysis appliance 100 directly (e.g., to provide commands to the visualization engine 131).

The processing pipeline 110, in some embodiments, processes flow data (e.g., flow attribute sets, also referred to as flow group records) received from the host computers in the system for analysis by other elements of the appliance (e.g., the anomaly detector 150). When two DCNs 155 within the datacenter communicate with each other and their respective host computers 105 both provide flow attribute sets for the flow to the analysis appliance 100, the processing pipeline 110 deduplicates these flow attributes sets (i.e., into a single flow attribute set). This deduplication process matches these flows (e.g., based on flow keys) and, in some embodiments, generates a new flow attribute set for the data flow that includes all unique attributes from both the source and destination host computer flow attribute sets. The processing pipeline 110 stores these flow attribute sets in the data storages 120 (e.g., the flow group records 121). In some embodiments, in addition to deduplication, the processing pipeline 110 also identifies and groups corresponding flow attribute sets (e.g., for reverse direction flows, or otherwise-related flows). These flow attribute sets are also combined and stored in, e.g., the flow group records 121). The processing pipeline 110 of some embodiments also fills in missing information for flow attribute sets, if needed (e.g., DCN identifiers for remote DCNs, etc.) using other flow attribute sets or other information (e.g., by matching DCN identifiers to network addresses already present in the flow attribute sets). Correlation of flow attribute sets can again be performed after this missing information is filled in. Additional description of the processing pipeline 110 is found in U.S. patent application Ser. No. 16/520,220, now issued as U.S. Pat. No. 11,398,987, which is incorporated herein by reference.

The data storages 120 include, in some embodiments, a data storage for each different type of data received (e.g., a correlated flow group record data storage 121, a contextual attribute data storage 122, a configuration data storage 123, and a time series data storage 124). The contextual attribute data storage 122, in some embodiments, stores received contextual attribute data from multiple host computers and uses that data for populating the time series data storage 124 with contextual attribute data (e.g., in a contextual attribute topic). In some embodiments, the contextual attribute data storage 122 is used in correlating contextual attributes with flow group records for display. The time series data storage 124 is used additionally, or alternatively, in other embodiments, for correlating contextual attribute data to flow group record data.

The contextual attribute data storage 122, in some embodiments, receives contextual attribute data sets including any, or all, of: data regarding guest metadata, guest events, and guest DCN metrics. In some embodiments, the guest metadata includes any or all of DCN details (a universally unique identifier [uuid], a bios uuid and a vmxpath), operating system details (type of OS and version information), and process details (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that many additional pieces of information may be provided to a contextual attribute data storage and that the partial list above serves only as an example.

In some embodiments, the set of data storages 120 includes a flow group record data storage 121. In some embodiments, this data storage 121 stores flow attribute sets after aggregation and correlation with configuration data stored in the configuration data storage 123. The flow group record data storage 121, in some embodiments, also stores learned pairings of IP addresses and DCN identifiers. In some embodiments, the learning is based on previously processed flow record groups. The correlated flow group record data storage 121, in some embodiments, provides processed (e.g., aggregated and correlated) flow group records to the time series data storage.

The configuration data storage 123, in some embodiments, receives configuration data (e.g., management plane configuration and/or policy configuration) from a network manager controller. The management plane configuration data includes information relating to group membership (in terms of DCN), and the policy configuration data sets include information about service rules (e.g., firewall rules), in some embodiments. The service rules, in some embodiments, are expressed in terms of any of IP addresses, ports, protocols, groups, etc., in any combination. In some embodiments, an initial set of configuration data is sent at startup or reboot of either the network manager computer or the analysis appliance, while subsequent configuration data sets include only changes to the last configuration data set.

A time series data storage 124, in some embodiments, stores flow group records, configuration data, and context data. In some embodiments, the time series data storage 124 is organized by topic with each different type of data stored in a different topic. Additionally, in some embodiments, each topic is organized in a time series fashion by use of an index that is appended to each set of data and is coordinated among all the producers of data for the topic. The time series data storage 124 is organized at multiple levels of temporal granularity, in some embodiments. In some embodiments, the different levels of granularity include some combination of hourly, daily, weekly, and monthly. The different levels of temporal granularity are used, in some embodiments, for data collected for a previous 24 hours (e.g., organized on an hourly basis), data for a previous 6 days (e.g., organized on a daily basis), data for a previous 30 days (e.g., organized on a daily or weekly basis), and data received more than 30 days earlier (e.g., organized on a monthly basis). The data organized based on the various levels of temporal granularity are, in some embodiments, periodically (e.g., daily, hourly, etc.) rolled up into the next level of granularity.

The anomaly detector 150 of some embodiments analyzes the correlated flow attribute sets in batches as they are received and correlated by the processing pipeline 110, in some embodiments (i.e., as opposed to retrieving data from the storages 120). In some embodiments, the anomaly detector 150 includes a port scan detection module 170, which performs the below-described processes to identify slow port scans and vertical port scans threatening the datacenter. The anomaly detector 150 may include other modules for detecting other types of anomalies as well by examining the batches of correlated flow attribute sets. The anomaly detector 150 reports these anomalies to the anomaly processing engine 132, which can perform additional analysis.

In addition to processing anomalies reported by the anomaly detector 150, the anomaly processing engine 132 of some embodiments analyzes the time series data 124 to detect additional anomalies. The anomaly processing engine 132 can also report these anomalies to the network manager 107 or to a user interface (e.g., via the visualization engine 131). The visualization engine 131, in some embodiments, generates a graphical user interface that can be used to provide information about DCNs including flows, contextual attributes, etc. Additional information about the data storages 120 and the processing engines 130 (and the analysis appliance 100 more generally) can be found in U.S. patent application Ser. No. 16/520,220, which is incorporated by reference above.

Figure 2:
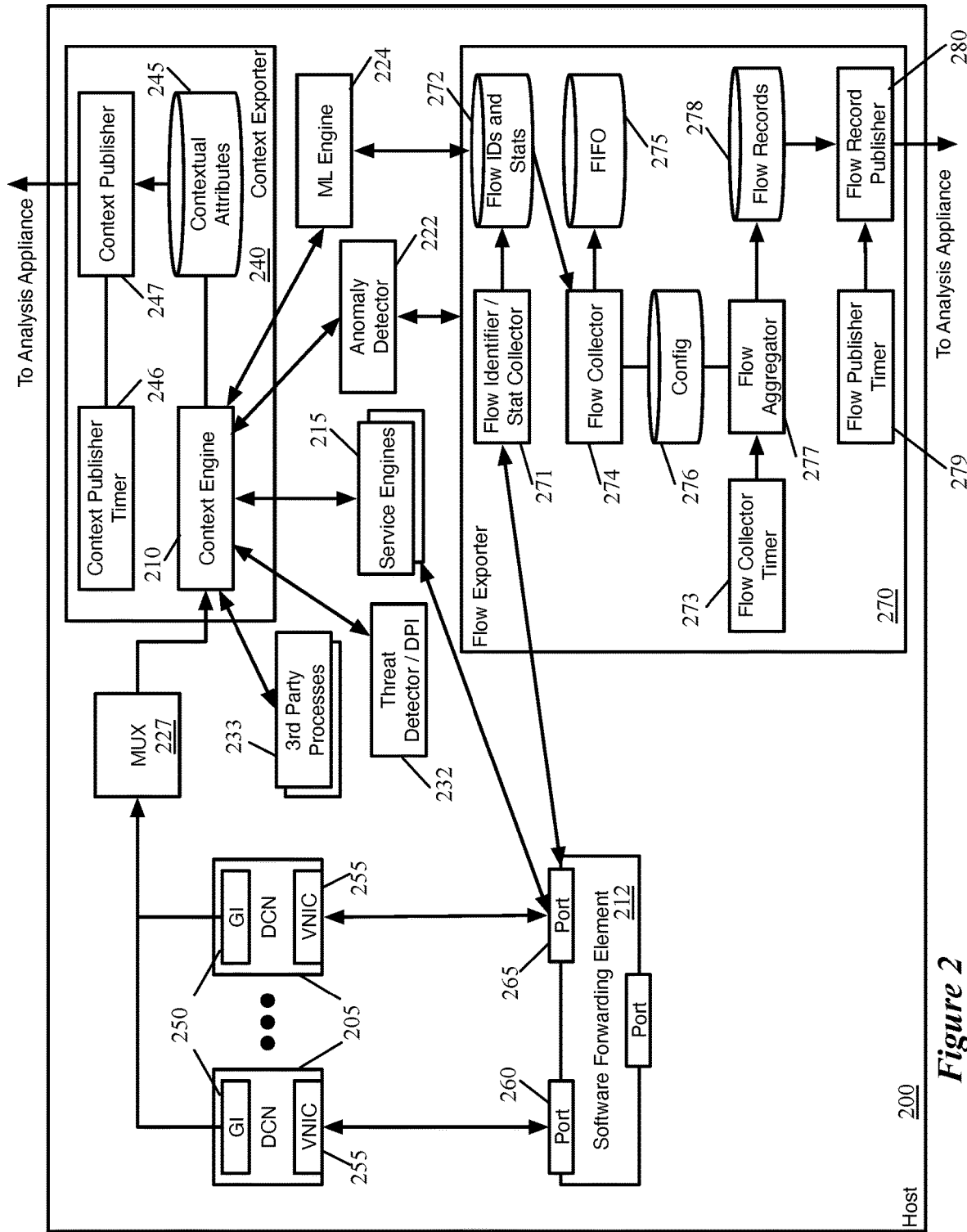
FIG. 2 conceptually illustrates a host computer of some embodiments, focusing on the context exporter and flow exporter that collect, aggregate, and publish aggregated data to the analysis appliance.

FIG. 2 conceptually illustrates a host computer 200 (e.g., one of the host computers 105) of some embodiments in more detail, specifically focusing on the context exporter 240 and flow exporter 270 that collect, aggregate, and publish aggregated data to the analysis appliance. As shown, the host computer 200 also executes several data compute nodes (DCNs) 205, a set of service engines 215, a threat detector/deep packet inspection (DPI) module 232, a set of third-party processes 233, a MUX (multiplexer) 227, an anomaly detector 222, a machine learning (ML) engine 224, and a software forwarding element 212.

Guest introspection agents 250 execute on the DCNs 205 and extract context data from the DCNs 205. For example, a guest introspection agent 250, in some embodiments, detects that a new data flow has been initiated (e.g., by sending a SYN packet in a data flow using TCP) and collects introspection data (e.g., a set of attributes of the data flow and DCN). The introspection data, in some embodiments, includes any, or all, of data regarding (i) guest metadata, (ii) guest events, and (iii) guest DCN metrics. In some embodiments, the guest metadata includes any, or all, of data regarding DCN 205 (a universally unique identifier [uuid], a bios uuid and a vmxpath), operating system data (type of OS and version information), and process data (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that much of the context data, in some embodiments, is not included in L2-L7 headers of a flow and that many additional pieces of information may be collected by guest introspection agent 250. The partial list above serves only as an example of the types of information that can be gathered by guest introspection agent 250.

In some embodiments, the guest introspection agents 250 send the collected context information to the context exporter 240 (specifically to the context engine 210) through a multiplexer 227. The context exporter 240 includes the context engine 210, a contextual attribute storage 245, a context publisher timer 246, and a context publisher 247. The context exporter 240 processes context data (e.g., contextual attribute data sets) at the host computer 200 and publishes the context data to the analysis appliance. The context engine 210 also provides the received context information to other elements operating in the host computer 200 and correlates this context data with context data received from other sources.

In some embodiments, the other sources include the set of service engines 215, the threat detector/DPI module 232, third-party software (processes) 233, the anomaly detector 222, and the ML engine 224. The context engine 210, in some embodiments, correlates the context data from the multiple sources for providing the correlated context data (e.g., sets of correlated contextual attributes) to the context publisher 247 (e.g., through context attribute storage 245).

As shown, each DCN 205 also includes a virtual network interface controller (VNIC) 255 in some embodiments. Each VNIC is responsible for exchanging messages between its respective DCN and the SFE 212 (which may be, e.g., a virtual switch or a set of virtual switches). Each VNIC 255 connects to a particular port 260-265 of the SFE 212. The SFE 212 also connects to a physical network interface controller (PNIC) (not shown) of the host. In some embodiments, the VNICs are software abstractions of one or more physical NICs (PNICs) of the host created by the virtualization software of the host (within which the software forwarding element 212 executes).

In some embodiments, the SFE 212 maintains a single port 260-265 for each VNIC of each DCN. The SFE 212 connects to the host PNIC (through a NIC driver [not shown]) to send outgoing messages and to receive incoming messages. In some embodiments, the SFE 212 is defined to include one or more ports that connect to the PNIC driver to send and receive messages to and from the PNIC. The SFE 212 performs message-processing operations to forward messages that it receives on one of its ports to another one of its ports. For example, in some embodiments, the SFE 212 tries to use data in the message (e.g., data in the message header) to match a message to flow-based rules, and upon finding a match, to perform the action specified by the matching rule (e.g., to hand the message to one of its ports, which direct the message to be supplied to a destination DCN or to the PNIC).

In some embodiments, the SFE 212 is a software switch (e.g., a virtual switch), while in other embodiments it is a software router or a combined software switch/router, and may represent multiple SFEs (e.g., a combination of virtual switches and virtual routers). The SFE 212, in some embodiments, implements one or more logical forwarding elements (e.g., logical switches or logical routers) with SFEs 212 executing on other hosts in a multi-host environment. A logical forwarding element, in some embodiments, can span multiple hosts to connect DCNs that execute on different hosts but belong to one logical network. Different logical forwarding elements can be defined to specify different logical networks for different users, and each logical forwarding element can be defined by multiple software forwarding elements on multiple hosts. Each logical forwarding element isolates the traffic of the DCNs of one logical network from the DCNs of another logical network that is serviced by another logical forwarding element. A logical forwarding element can connect DCNs executing on the same host and/or different hosts, both within a datacenter and across datacenters. In some embodiments, the SFE 212 extracts from a data message a logical network identifier (e.g., a VNI) and a MAC address. The SFE 212 in such embodiments uses the extracted VNI to identify a logical port group or logical switch, and then uses the MAC address to identify a port within the port group or logical switch.

The ports of the SFE 212, in some embodiments, include one or more function calls to one or more modules that implement special input/output (I/O) operations on incoming and outgoing messages that are received at the ports 260-265. Examples of I/O operations that are implemented by the ports 260-265 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 260-265 can implement a chain of I/O operations on incoming and/or outgoing messages in some embodiments. Also, in some embodiments, other modules in the data path (such as the VNICs 255 and the ports 260-265, etc.) implement the I/O function call operations instead of, or in conjunction with, the ports 260-265. In some embodiments, one or more of the function calls made by the SFE ports 260-265 can be to service engines 215, which query the context engine 210 for context information that the service engines 215 use (e.g., to generate context headers that include context used in providing a service and to identify service rules applied to provide the service). In some embodiments, the generated context headers are then provided through the port 260-265 of SFE 212 to flow exporter 270 (e.g., flow identifier and statistics collector 271).

The flow exporter 270 monitors flows, collects flow data and statistics, aggregates flow data into flow group records, and publishes flow attribute sets (also referred to as flow group records) for consumption by the analysis appliance. In some embodiments, the flow exporter 270 generally aggregates statistics for individual flows identified during multiple time periods, and for each time period identifies multiple groups of flows with each group including one or more individual flows. For each identified flow group, the flow exporter 270 identifies a set of attributes by aggregating one or more subsets of attributes of one or more individual flows in the group as described below in greater detail. In some embodiments, the subset of attributes of each individual flow in each group is the aggregated statistics of the individual flow. After the multiple time periods, flow exporter 270 provides the set of attributes for each group identified in the multiple time periods to the analysis appliance for further analysis of the identified flows.

As shown, the flow exporter 270 includes a flow identifier/statistics collector 271, a flow identifier and statistics storage 272, a flow collector timer 273, a flow collector 274, a first-in first-out (FIFO) storage 275, a configuration data storage 276, a flow aggregator 277, a flow group record storage 278, a flow publisher timer 279, and a flow group record publisher 280. These modules collectively collect and process flow data to produce and publish flow attribute sets.

The flow exporter 270 receives flow information, including flow identifiers and statistics, at the flow identifier/statistics collector 271. In some embodiments, the received flow information is derived from individual data messages that make up the flow and includes context data used in making service decisions at service engines 215. The flow exporter 270 stores the received information associated with particular flows in the flow identifier and statistics storage 272. The statistics, in some embodiments, are summarized (accumulated) over the life of the particular flow (e.g., bytes exchanged, number of packets, start time, and duration of the flow).

The flow collector 274, in some embodiments, monitors the flows to determine which flows have terminated (e.g., timeouts, FIN packets, RST packets, etc.) and collects the flow identifiers and statistics and pushes the collected data to FIFO storage 275. In some embodiments, the flow collector 274 collects additional configuration data from configuration data storage 276 and includes this additional configuration data with the data collected from flow identifier and statistics storage 272 before sending the data to FIFO storage 275.

Additionally, the flow collector 274, in some embodiments, collects data for long-lived active flows (e.g., flows lasting longer than half a publishing period) from the flow identifier and statistics storage 272 before the end of a publishing period provided by flow publisher timer 279. In some embodiments, the data collected for a long-lived active flow is different from the data collected for terminated flows. For example, active flows are reported using a start time but without a duration in some embodiments. Only flows meeting certain criteria are collected by the flow collector 274 in some embodiments. For example, only information for flows using a pre-specified set of transport layer protocols (e.g., TCP, UDP, ESP, GRE, SCTP) are collected, while others are dropped or ignored. In some embodiments, additional types of traffic, such as broadcast and multicast, safety check (e.g., having ruleID=0 or 0 rx and tx byte/packet counts), L2 flows, flows which are not classified as one of (i) inactive, (ii) drop, or (iii) reject, are dropped (i.e., not collected or not placed into FIFO storage 275).

In some embodiments, the FIFO storage 275 is a circular or ring buffer such that only a certain number of sets of flow identifiers and flow statistics can be stored before old sets are overwritten. In order to collect all the data placed into FIFO storage 275, or at least to not miss too much (e.g., miss less than 5% of the data flows), the flow aggregator 277 pulls data stored in FIFO storage 275 based on a flow collection timer 273 and aggregates the pulled data into aggregated flow group records. Some embodiments pull data from the FIFO storage 275 based on a configurable periodicity (e.g., every 10 seconds), while other embodiments, alternatively or in addition to the periodic collection, dynamically determine when to collect data from FIFO storage 275 based on a detected number of data flows (e.g., terminated data flows, a total number of active data flows, etc.) and the size of FIFO storage 275. Each set of flow data pulled from FIFO storage 275 for a particular flow, in some embodiments, represents a unidirectional flow from a first endpoint (e.g., machine or DCN) to a second endpoint. If the first and second endpoints both execute on the same host computer 200, in some embodiments, a same unidirectional flow is captured at different ports 260-265 of the software forwarding element 212. To avoid double counting a same data message provided to the flow identifier 271 from the two ports 260-265, the flow identifier 271 uses a sequence number or other unique identifier to determine if the data message has been accounted for in the statistics collected for the flow. Even if duplicate data messages for a single unidirectional flow have been accounted for, the flow aggregator 277 additionally combines sets of flow data received for the separate unidirectional flows into a single set of flow data in some embodiments. This deduplication (deduping) of flow data occurs before further aggregation in some embodiments and, in other embodiments, occurs after an aggregation operation.

The flow aggregator 277, in some embodiments, receives a set of keys from the analysis appliance through the network manager computer that specify how the flow data sets are aggregated. After aggregating the flows, the flow aggregator 277 performs a deduplication process to combine aggregated flow group records for two unidirectional flows between two DCNs 205 executing on host machine 200 into a single aggregated flow group record and stores the aggregated records in flow group record storage 278. From flow group record storage 278, flow group record publisher 280 publishes the aggregated flow group records to an analysis appliance according to a configurable timing provided by flow publisher timer 279. After publishing the aggregated flow group records (and, in some embodiments, receiving confirmation that the records were received), the records stored for the previous publishing time period are deleted and a new set of aggregated flow group records are generated.

In some embodiments, one of the flow aggregator 277 and the context engine 210 performs another correlation operation to associate the sets of correlated contextual attributes stored in contextual attribute storage 245 with the aggregated flow group records stored in the flow group record storage 278. In some embodiments, the correlation includes generating new flow attribute sets with additional attribute data included in existing attribute fields or appended in new attribute fields. In other embodiments, the sets of correlated contextual attributes and aggregated flow group records are tagged to identify related sets of aggregated flow group records and contextual attribute data. In some embodiments, the generated new flow group records are published from one of the publishers (e.g., flow group record publisher 280 or context publisher 247). In other embodiments, flow group record publisher 280 publishes the tagged aggregated flow group records and the context publisher 247 publishes the tagged sets of correlated contextual attributes.

The anomaly detection engine 222, in some embodiments, receives flow data (from any of flow identifier and statistics storage 272, FIFO storage 275, or flow group record storage 278) and context data from context engine 210 and detects, based on the received data, anomalous behavior associated with the flows. For example, based on context data identifying the application or process associated with a flow, anomaly detection engine 222 determines that the source port is not the expected source port and is flagged as anomalous. The detection in some embodiments includes stateful detection, stateless detection, or a combination of both. Stateless detection does not rely on previously collected data at the host, while stateful detection, in some embodiments, maintains state data related to flows and uses the state data to detect anomalous behavior. For example, a value for a mean round trip time (RTT) or other attribute of a flow and a standard deviation for that attribute may be maintained by anomaly detection engine 222 and compared to values received in a current set of flow data to determine that the value deviates from the mean value by a certain number of standard deviations that indicates an anomaly. In some embodiments, anomaly detection engine 222 appends a field to the set of context data that is one of a flag bit that indicates that an anomaly was detected or an anomaly identifier field that indicates the type of anomaly detected (e.g., a change in the status of a flow from allowed to blocked [or vice versa], a sloppy or incomplete TCP header, an application/port mismatch, or an insecure version of an application). In some embodiments, the additional context data is provided to context engine 210 separately to be correlated with the other context data received at context engine 210. As will be understood from the discussion above, the anomaly detection process may use contextual attributes not in L2-L4 headers such as data included in L7 headers and additional context values not found in headers.

In some embodiments, the anomaly detection engine 222 takes an action or generates a suggestion based on detecting the anomaly. For example, anomaly detection engine 222 can block an anomalous flow pending user review or suggest that a new firewall rule be added to a firewall configuration. In some embodiments, the anomaly detection engines 222 on each host computer 200 can report these anomalies (e.g., via the context publisher 247) to the analysis appliance for further analysis by the anomaly processing engine.

The machine learning engine 224, in some embodiments, receives flow data (from any of the flow identifier and statistics storage 272, the FIFO storage 275, and the flow group record storage 278) and context data from the context engine 210 and performs analysis on the received data. The received data (e.g., flow group records), in some embodiments, includes attributes normally recorded in a 5-tuple as well as additional L7 attributes and other contextual attributes such as user sid, process hash, URLs, appId, etc., that allow for better recommendations to be made (e.g., finer-grained firewall rules). In some embodiments, the analysis identifies possible groupings of DCNs 205 executing on the host computer 200. In some embodiments, the analysis is part of a distributed machine learning processing and the results are provided to the context engine 210 as an additional contextual attribute.

As noted above, the analysis appliance of some embodiments uses the flow attribute sets received from the host and correlated by the processing pipeline to detect (i) sources that attempt to identify open ports on many DCNs in the datacenter (e.g., using a slow port scan) and/or (ii) sources that perform vertical port scans in an attempt to find open ports to attack on a specific DCN. Some embodiments use different analyses to identify these two different types of port scanning attack. In some embodiments, the detection of the first type of source (that performs a slow port scan) involves collectively analyzing data received from many host computers in the datacenter, while the detection of the second type of source (that performs a vertical port scan) involves analyzing data received from individual host computers in the datacenter.

Figure 3:
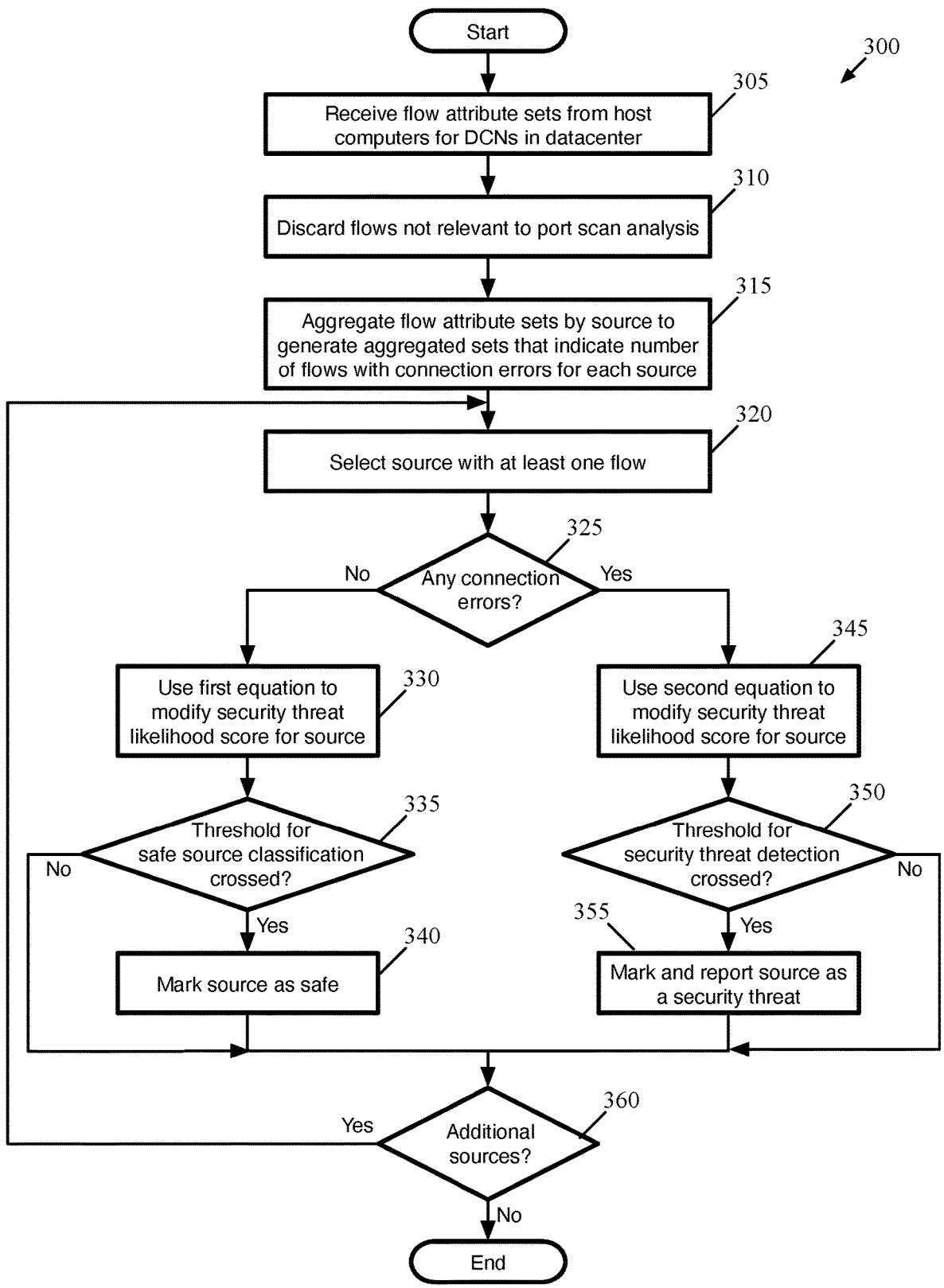
FIG. 3 conceptually illustrates a process of some embodiments for identifying sources that pose a security threat from a slow port scan.

FIG. 3 conceptually illustrates a process 300 of some embodiments for identifying sources that pose a security threat from a slow port scan (i.e., sources that are port scanners performing a slow port scan). The process 300 is performed, in some embodiments, by an anomaly detector in the analysis appliance (e.g., the port scan detection module 170 of the anomaly detector 150 shown in FIG. 1). This anomaly detector receives correlated flow attribute sets in batches (e.g., every X seconds) from the processing pipeline of the analysis appliance (e.g., via a messaging queue). The process 300 will be described in part by reference to FIGS. 4 and 5, which respectively illustrate examples of flow aggregation by source and source scoring based on the aggregated flow attribute sets.

As shown, the process 300 begins by receiving (at 305) flow attribute sets from host computers for DCNs in the datacenter. As described above, the flow exporters on each of the host computers (or a subset of host computers that execute DCNs relevant to analysis appliance) provide the flow attribute sets to the analysis appliance, which correlates the flow attribute sets and provides them to the anomaly detector in a batch. These flow attribute sets can be provided at configurable time intervals (e.g., every 30 seconds, every minute, every 5 minutes, etc.) or after a particular amount of data is received and correlated.

Next, the process 300 discards (at 310) flow attribute sets for flows that are not relevant to the port scanner analysis. As described further below by reference to FIGS. 6-8, some embodiments discard flow attribute sets for unidirectional flows exiting the datacenter (i.e., flows for which the source is a DCN in the datacenter and the destination is outside the datacenter) and flows with protocols that are not indicative of port scanning. In addition, to apply additional rigor to the port scanning analysis, some embodiments also discard flow attribute sets for flows with connection errors to open ports on the destination DCN of the flow, as well as flows with connection errors that have previously been accounted for in previous batches.

The process 300 then aggregates (at 315) the flow attribute sets by source to generate aggregated sets that indicate the number of flows with connection errors for each source. The flow attribute sets, in some embodiments, include at least source network address, destination network address, destination transport layer port number, transport protocol, and numbers of one or more threat indicators (e.g., different types of connection errors). The source network address is used as a source identifier to aggregate attribute sets. In some embodiments, the aggregated attribute set for a particular source specifies the number of flows from the particular source that include at least one connection error rather than the total number of connection errors. This avoids punishing sources that have been misconfigured (e.g., to access port 500 instead of port 50) and repeatedly attempt to access the same incorrect port on a datacenter DCN.

Figure 4:
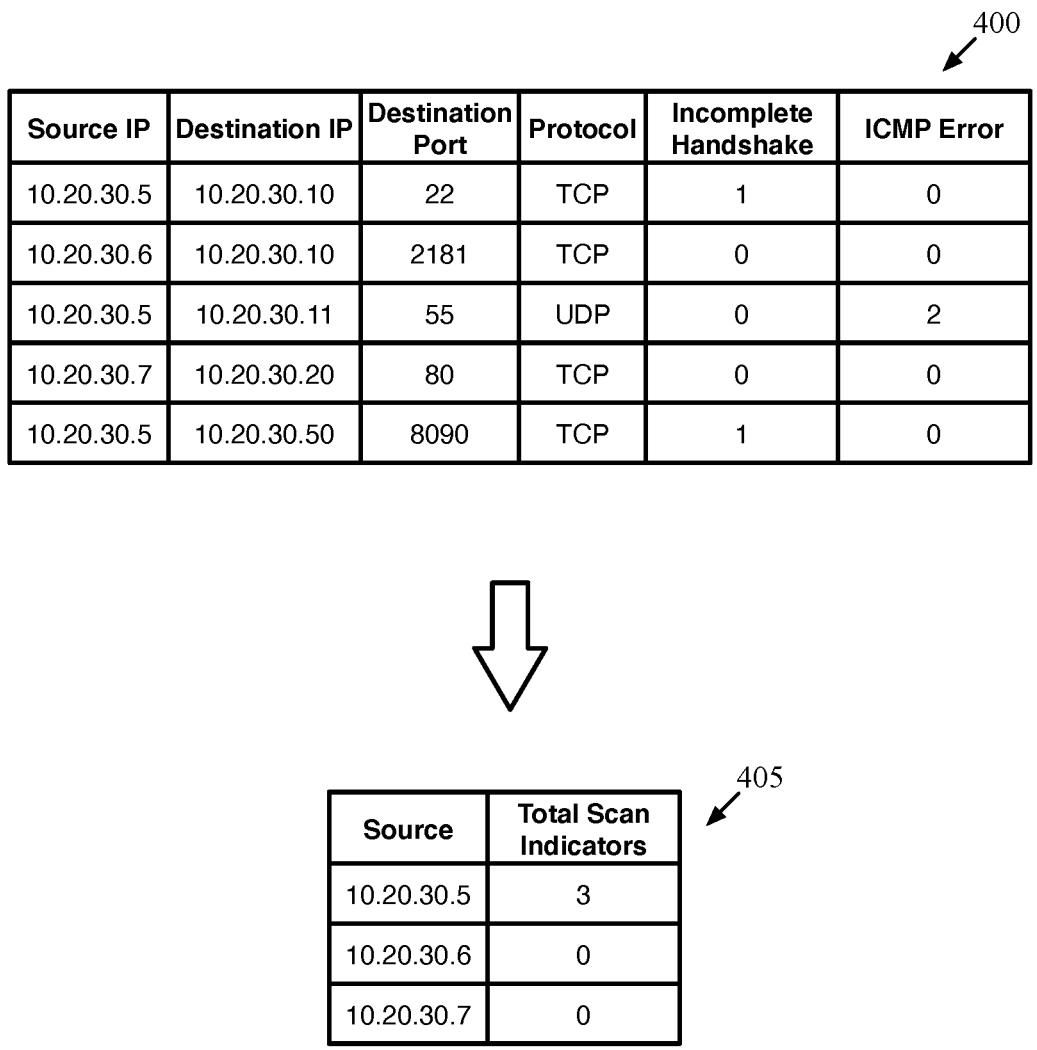
FIG. 4 conceptually illustrates an example of a batch of flow attribute sets that are aggregated by source into aggregated flow attribute sets.

FIG. 4 conceptually illustrates an example of a batch of flow attribute sets 400 that are aggregated by source into aggregated flow attribute sets 405. Each of the flow attribute sets specifies the source and destination network addresses (IP addresses), the destination port, the protocol (in this case, either TCP or UDP), the number of incomplete TCP handshakes, and the number of ICMP errors. An incomplete TCP handshake occurs (among other reasons) when a client tries to establish a TCP connection with a server on a particular port on which no service is listening. That is, the client (source) sends a SYN message, and rather than the server (destination DCN) responding with a SYN/ACK message (to continue the handshake), the server responds with an RST message. In addition, even if the port is open and the server responds with a SYN/ACK message, if the client does not complete the handshake by sending an ACK message (as may be the case for TCP half-handshake scanners) then the flow is marked as having an incomplete handshake. If the client uses UDP rather than TCP and attempts to send a data message to a closed port, the server often responds with an ICMP error message. The modules executing on the host computers (e.g., the anomaly detectors on the host computers, the service engines such as a distributed firewall module, etc.) detect these messages and ensure that they are included in the flow attribute sets exported to the analysis appliance.

In the example of flow attribute sets 400, there are three flows from source 10.20.30.5, one flow from source 10.20.30.6, and one flow from source 10.20.30.7. The latter two flows do not have any associated errors detected, while all three of the flows from the first source have errors. The first flow, with destination IP address 10.20.30.10 and destination port 22, is a TCP flow with an incomplete TCP handshake detected. The second flow, with destination IP address 10.20.30.11 and destination port 55, is a UDP flow with two ICMP errors detected. The last flow, with destination IP address 10.20.30.50 and destination port 8090, is a TCP flow with an incomplete TCP handshake detected. Although four total errors are detected for these flows, the aggregated flow attribute set for the source 10.20.30.5 includes three total scan indicators, because the two ICMP errors for the same flow are only counted once.

The slow port scan detection process 300 of some embodiments uses these combined measurements from the aggregated attribute sets to adjust security threat likelihood scores for each of the sources. These scores measure the likelihood that their corresponding source poses a security threat (i.e., the likelihood that the source is a port scanner). As described, some embodiments batch process the flow attribute sets by generating the combined measurement of threat indicators at regular intervals (or non-regular intervals). The scores for any sources with flows in the batch (that are not discarded at 310) are updated based on the scan indicator number in the aggregated flow attribute sets at each interval.

As shown, after aggregating the flow attribute sets, the process 300 selects (at 320) a source with at least one flow in the batch. It should be understood that the process 300 is a conceptual process, and that the actual operation may vary. For example, while this process shows the score each source being updated serially, some embodiments perform these updates for multiple sources in parallel. In some embodiments, from interval to interval, the only data (relevant to the port scan detection) stored by the anomaly detector for each source is a score indicating the likelihood that the source is a threat (i.e., a port scanner). By not storing the aggregated flow attribute sets for the prior intervals, this saves a significant amount of memory (because a typical datacenter, especially one with services accessible from external sources, will have large numbers of incoming data flows from a large number of sources).

Though not shown in FIG. 3, whenever a new source is identified (i.e., a source for which the anomaly detector does not have any data), in some embodiments the anomaly detector initializes a default score for that source prior to performing the subsequent analysis.

The process 300 then determines (at 325) whether there are any connection errors for the selected source. To adjust the security score for a source, some embodiments use different equations depending on whether the aggregated attribute set for the source includes any threat indicators (e.g., connection errors) for the interval. These equations push the scores in different directions (e.g., higher scores for suspected port scanners and lower scores for suspected safe sources). In some embodiments, as will be described in greater detail, both of these equations use (i) a first probability ($P_{ps}$) that a flow initiated by a port scanner will be successful (i.e., will not have any connection errors) and (ii) a second probability ($P_s$) that a flow initiate by a non-threatening source (i.e., a source that is not a port scanner) will be successful.

As shown in the figure, if there are no connection errors for a source (for which there is at least one flow), the process 300 uses (at 330) a first equation to modify the security threat likelihood for the selected source. Some embodiments use an equation of the form:

$$S_1 = S_0 * c * \frac{P_{ps}}{P_s},$$

where $S_0$ is the score before the update, $S_1$ is the score after the update, c is a constant value (e.g., 1.0, 0.5, etc.), and $P_{ps}$ and $P_s$ are the probabilities given above. In this case, because the probability of a flow being initiated successfully is significantly less when the source is a port scanner, the ratio of probabilities is significantly less than 1 and (assuming the constant is set to 1 or less) the equation reduces the score each time interval that the source sends at least one flow without a connection error.

The process 300 then determines (at 335) whether the score crosses a threshold for classifying the source as a safe source (i.e., quite likely not a port scanner). Assuming that the first equation lowers the score, this threshold is a lower bound, such that the source is classified as a safe source once the score drops below this threshold. If the score crosses this threshold, the process 300 marks (at 340) the source as safe. In some embodiments, once a source is marked as safe, the anomaly detector in the analysis appliance stops tracking the score for that source in order to save on memory. Once new flows are received from the source, a new score can be initialized for the source.

On the other hand, if there is at least one connection error for the selected source, the process 300 uses (at 345) a second equation to modify the security threat likelihood for the selected source. Some embodiments use an equation of the form:

$$S_1 = S_0 * N_{si} * \frac{1 - P_{ps}}{1 - P_s},$$

where $S_0$ is the score before the update, $S_1$ is the score after the update, $N_{si}$ is the number of flows with scan indicators (e.g., connection errors) for the source, and $P_{ps}$ and $P_s$ are the probabilities given above. In this case, because the probability of a flow being initiated successfully is significantly less when the source is a port scanner, the ratio of probabilities is significantly greater than 1 and the equation will increase the score each time interval that the source sends at least one flow with a connection error. The effect of these two equations is a push and pull effect, in which time intervals with only successful flows pull a source's score down while time intervals with connection errors push a source's score up.

The process 300 then determines (at 350) whether the score crosses a threshold for classifying the source as a detected security threat (i.e., a port scanner). Assuming that this equation increases the score, this threshold is an upper bound, such that the source is classified as a port scanner once the score increases above the threshold. If the score crosses this threshold, the process 300 marks and reports (at 355) the source as a security threat. In some embodiments, once a source is marked as a port scanner, the anomaly detector in the analysis appliance stops tracking the score for that source in order to save on memory. Once new flows are received from the source, a new score can be initialized for the source.

The anomaly detector also reports security threats (i.e., port scanners in this case) in some embodiments. In some embodiments, the anomaly detector reports the detected port scanners to the processing engines of the analysis appliance for further processing (e.g., by the anomaly processing engine). In addition, the visualization engine may present information about the suspected port scanner to the user in the user interface of the analysis appliance. This allows the user to take action (e.g., to instruct the network to block the source IP address, to log into the source if it is a DCN within the datacenter, etc.).

In some embodiments, the analysis appliance also provides the information to the network management system for the datacenter, which can take other automatic actions. For example, the network management system of some embodiments automatically generates a distributed firewall to block data traffic from the suspected port scanner and provides this rule to the host computers so the distributed firewall engines on the host computers can enforce the rule. In other embodiments, if the source is a DCN in the datacenter (e.g., that has been maliciously taken over), the network manager attempts to identify the specific process performing the port scan and either shut that process down or generate firewall rules to block the specific process.

In addition, some embodiments upload information about the source to a collaborative tool (e.g., in a cloud datacenter) that tracks reputation scores for particular sources in order to enable detection of port scanners across multiple datacenters. These reputation scores can also be used in detection of port scanners in some embodiments.

Finally, the process 300 determines (at 360) whether additional sources remain with aggregated flow attribute sets to evaluate. If additional sources remain, the process 300 returns to 320 to select the next source and adjust the security threat likelihood score for that source. Once all of the sources have been evaluated for the time interval, the process 300 ends.

FIG. 5 illustrates how the security threat likelihood scores for two different sources are changed over several time windows depending on the number of connection errors identified in each time window. In this example, the scores for each source are initialized (prior to time window T0) to 1. In addition, the lower bound (for marking a source as safe) is set to 0.001, while the upper bound (for marking a source as a port scanner) is set to 999. The anomaly detector uses the equations shown above in this case, with the constant c set to 1, $P_{ps}$ set to 0.2 and $P_s$ set to 0.8 (such that $P_{ps}/P_s=0.25$ and $(1-P_p)/(1-P)=4$)

In the first time window T0, no port scan indicators are identified for flows initiated by the first (genuine VM) source, whereas one port scan indicator is identified for flows initiated by the second source (an actual port scanner). As such, the score for the first source is multiplied by 0.25 while the score for the second source is multiplied by 4. The second time window T1 has the same respective numbers of identified port scan indicators, so the score for the first source is again multiplied by 0.25 (to equal 0.0625) while the score for the second source is again multiplied by 4 (to equal 32). In the third time window T2, the first source has two identified port scan indicators (even though it is actually a genuine VM) so this score is multiplied by 8 (to equal 0.5). The second source does not send any flows during this time window (or any such flows were discarded during pre-processing), so the score does not change. In the fourth time window T3, no port scan indicators are found for the first source while four separate flows from the second source had port scan indicators. Thus, the first source's score is again multiplied by 0.25 (to equal 0.125) while the score for the second source is multiplied by 16 (to equal 512). Finally, in the fifth time window T4, there are again no scan indicators for the first source, so this score is again reduced (to 0.03125) by multiplying the score by 0.25. Two scan indicators are identified for the second source, so the score is multiplied by 8 to 4096. As shown by the bolding and italics, this score is larger than the port scan detection threshold of 999, so at this point the source is marked as a likely port scanner and reported to the analysis appliance for additional processing and reporting to an administrator.

As noted above, some embodiments discard various flow attribute sets prior to aggregating these flow attribute sets by source. Different flow attribute sets may be discarded to remove flows that are presumed to be unhelpful in identifying port scanners (e.g., flows sent from DCNs in the datacenter to external destinations, flows with specific protocols not likely to be used by port scanners) as well as to reduce the likelihood of false positive identification of slow port scans (i.e., by discarding certain connection errors that are not necessarily indicative of a port scan). For instance, if a source DCN is misconfigured or if a destination service in the datacenter goes down, these may cause connection errors that are not the result of a port scanner.

Figure 6:
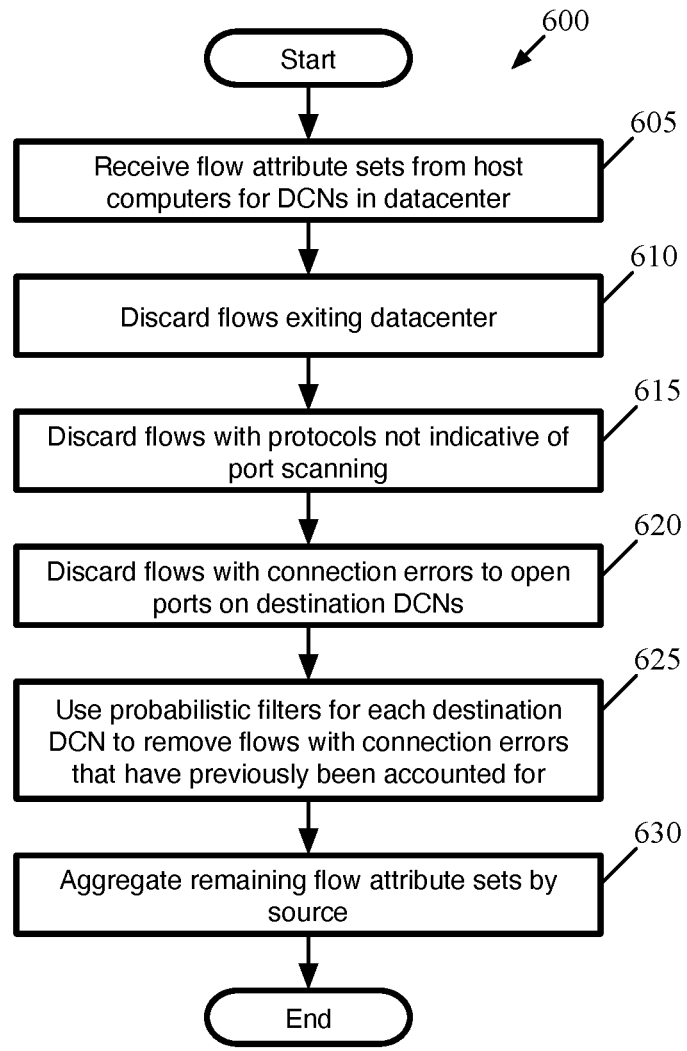
FIG. 6 conceptually illustrates a process of some embodiments for discarding flow attribute sets for a time interval prior to aggregating the flow attribute sets for port scan detection.

FIG. 6 conceptually illustrates a process 600 of some embodiments for discarding flow attribute sets for a time interval prior to aggregating the flow attribute sets for port scan detection. In some embodiments, the majority of the operations of the process 600 correspond to the operation 310 of the process 300 shown in FIG. 3. The process 600 will be described in part by reference to FIGS. 7 and 8, which respectively show examples of discarding flows to open ports and the use of filters to remove flows for which connection errors have previously been accounted.

As shown, the process 600 begins by receiving (at 605) flow attribute sets from host computers for DCNs in the datacenter. As described above, the flow exporters on each of the host computers (or a subset of host computers that execute DCNs relevant to analysis appliance) provide the flow attribute sets to the analysis appliance, which correlates the flow attribute sets and provides them to the anomaly detector in a batch. These flow attribute sets can be provided at configurable time intervals (e.g., every 30 seconds, every minute, every 5 minutes, etc.) or after a particular amount of data is received and correlated.

Next, the process 600 discards (at 610) flows exiting the datacenter. These are flows initiated by a DCN within the datacenter but directed to destinations external to the datacenter. Such flows are not related to port scans targeting the DCNs of the datacenter, and thus can be discarded. It should be noted that flows sent from one DCN in the datacenter to another DCN in the datacenter could be relevant, because the first DCN might have been maliciously taken over and now be acting as a port scanner.

The process 600 also discards (at 615) flows with protocols not indicative of port scanning. For instance, some embodiments discard from the analysis flows having any protocol other than TCP or UDP, as these are the most typical flows used by port scanners. Other embodiments discard flows with other sets of protocols.

Next, the process 600 discards (at 620) flows with connection errors to open ports on destination DCNs. Discarding these flows helps to remove false positives from the port scanner detection, because such flows are often the result of a genuine attempt to contact the DCN rather than a port scanner. For instance, while connection errors for flows sent to open ports could be the result of a port scanner initiating a flow, these errors could also be the result of a network glitch, the service listening on that port on the destination DCN being down temporarily, etc. Thus, some embodiments maintain a list of all open ports on each DCN in the datacenter and use this list as a filter to discard flows with connection errors to any of these port:DCN combinations (the DCN being identified by its destination network address in the flow attribute set). That is, if a TCP handshake is not completed to an open port, this might be the result of the service listening to the port being down, a network error, or a port scanner testing the port; on the other hand, if a TCP handshake is not completed to a closed port, this is more likely the result of a port scanner testing the port. Flows to open ports that do not have connection errors are not discarded (these should be the majority of flows received), as these flows provide evidence that a source is not a port scanner.

Figure 7:
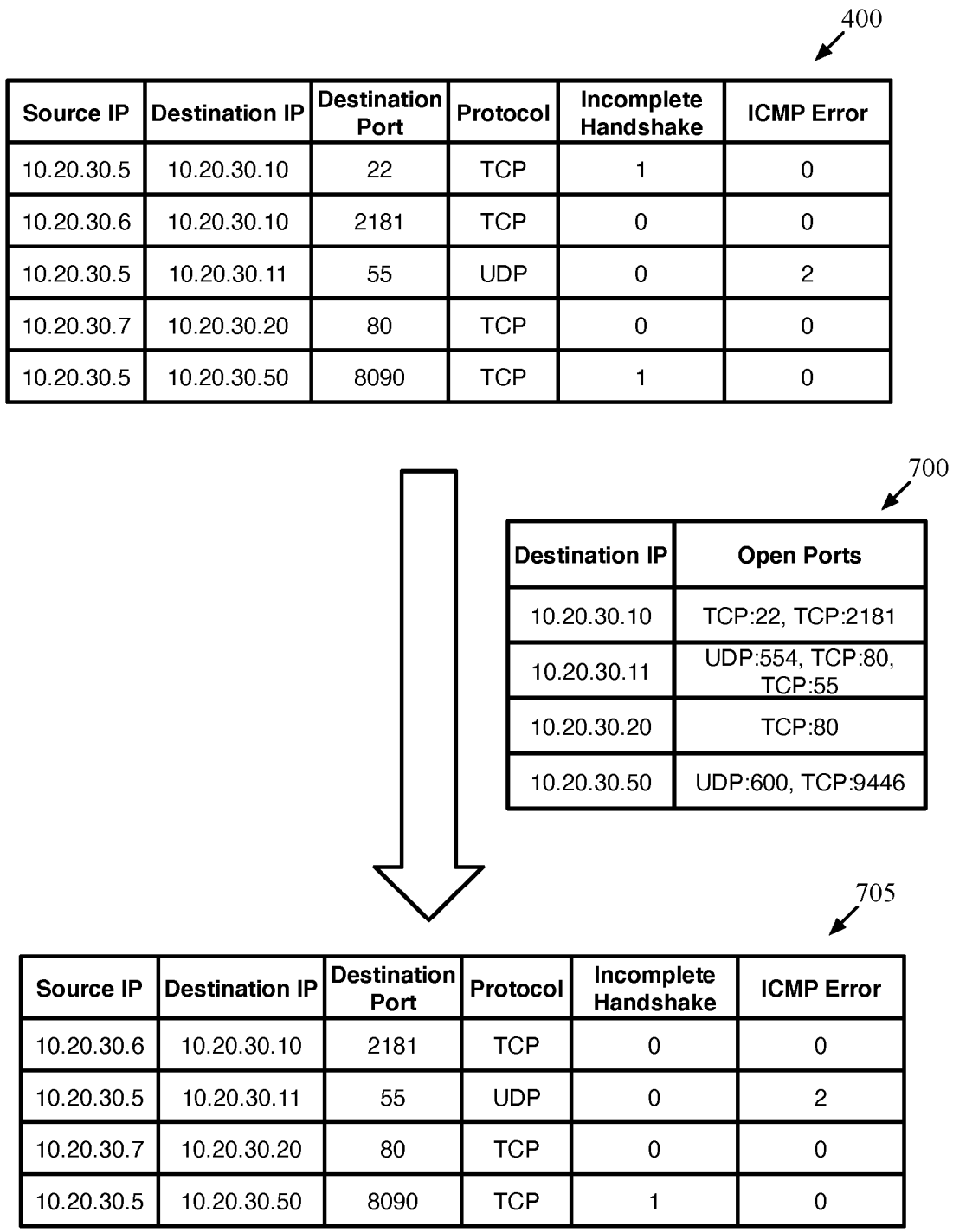
FIG. 7 conceptually illustrates an example of filtering out flow attribute sets with connection errors for flows to open ports on destination DCNs.

FIG. 7 conceptually illustrates an example of filtering out flow attribute sets with connection errors for flows to open ports on destination DCNs. As shown, the batch 400 of flow attribute sets (from FIG. 4) includes five flows, three of which have connection errors. This batch is filtered through a list 700 of open ports on destination DCNs in the datacenter, resulting in a filtered batch of flow attribute sets 705.

The DCN with IP address 10.20.30.10 has ports 22 and 2181 open for TCP connections, the DCN with IP address 10.20.30.11 has ports 80 and 55 open for TCP connections and has port 554 open for UDP connections, the DCN with IP address 10.20.30.20 has port 80 open for TCP connections, and the DCN with IP address 10.20.30.50 has ports 9446 open for TCP connections and port 600 open for UDP connections. In this case, the first flow (from source 10.20.30.5 to destination 10.20.30.10) is filtered out, because this is an attempted but unsuccessful TCP connection to port 22, which is open for TCP connections on the destination DCN. The successful TCP connection to port 2181 (which is also open) on this DCN is not filtered out, because there are no connection errors. In addition, the attempted UDP connection to port 55 on destination DCN 10.20.30.11 with two ICMP errors is not filtered out because only TCP connections are open for this port; similarly, the attempted TCP connection to port 8090 on destination DCN 10.20.30.50 is not filtered out because port 8090 is not open at all on this DCN.

While in theory a network administrator could provide the list of all open ports (and allowed protocols for each port) on each DCN in a datacenter, for a large datacenter this would be a difficult and time-consuming task. Instead, some embodiments use the analysis of flow attribute sets by the network analysis appliance to identify the open ports for each DCN. As described above by reference to FIG. 1, the network analysis appliance receives flow attribute sets from the host computers in the datacenter and performs a variety of analysis tasks on these flow attribute sets. For instance, when multiple flows from different sources with no connection errors to the same destination network address and port and are analyzed by the appliance, this port can be assumed to be open on the DCN with that network address. Some embodiments also interface with a compute management system to retrieve information about the services executing on each DCN to enhance the list of open ports.

Returning to FIG. 6, the process 600 also uses (at 625) probabilistic filters for each destination DCN to remove flows with connection errors that have previously been accounted for. A genuine source (i.e., not a port scanner) might be misconfigured and repeatedly attempt to initiate connections with the wrong port on a destination DCN (e.g., port 9090 instead of open port 8080). This source might repeatedly attempt to contact the incorrect port on the destination DCN, and each of these attempts would result in a connection error. If this activity is constrained to a single time interval, then the issue will be handled by the attribute set aggregation that only counts the number of flows with errors rather than the total number of errors. However, if the repeated attempts occur over the course of multiple time intervals, then using the process described above the source might be penalized each interval for the same misconfiguration until it is marked as a port scanner (i.e., penalizing the source for the depth of connection errors rather than for the breadth).

To avoid penalizing these sorts of misconfigured sources, some embodiments avoid counting connection errors for flows from the same source to the same port on the same destination DCN across multiple time intervals. Some embodiments maintain, for each source network address, a set of destination network address, destination port, and protocol 3-tuples for flows that have already been accounted for as having connection errors. In theory this can be done by simply maintaining an open-ended list of 3-tuples for each source, but doing so in a large datacenter would quickly use too much memory. In addition, because the port scan detection is performed as real-time or near-real time analysis task on batches of streamed flow attribute sets, the filtering should be done quickly. Searching an open-ended list could slow down the analysis after the list fills up.

Instead, some embodiments use a resource-based filter for each source that removes from analysis the majority of flows with connection errors that have previously been accounted for. In some embodiments, the filters are configured to optimize the number of records that can be stored given certain memory constraints (i.e., a preconfigured upper bound on the memory that the filter can use). If no specific upper bound is specified for the filters, some embodiments optimize storage such that memory consumption in the host on which the filter executes does not hamper other processes running on the host.

To implement the resource-based filter, some embodiments use (i) a least-recently used (LRU) cache backed by (ii) a probabilistic hash-based filter such as a bloom filter or cuckoo filter. Such a resource-based filter is instantiated for each destination DCN within the datacenter in some embodiments. An LRU cache is a cache that is sorted by the most recent use, such that when the cache fills up the least recently used entry is overwritten. Each of these caches (for a respective destination DCN) stores full source IP, destination port, and protocol 3-tuples for each flow sent to the respective destination DCN. The hash-based filter, meanwhile, stores entries for tuples that have been removed from the LRU cache in some embodiments. These entries are based on a hash (or hashes) of the 3-tuples, depending on how the particular hash-based filter is configured.

The size of the LRU cache, the number of records in the hash-based filter, the number of hash-based filters used, and other such details can be configured to change dynamically based on heuristics such as the current memory usage pattern of the computer(s) on which the filters execute, upper limits on the memory, amount and/or probability of error tolerated, eviction policies for data stored in the hash-based filters, etc.

As an example, if a resource-based filter is allotted 100 mb as an upper limit, a large LRU cache could be instantiated initially. This LRU cache on its own has zero probability of error because it stores all of the 3-tuples with connection errors previously seen for the destination DCN. As storage starts to increase, the least recently used records overwritten in the LRU cache are stored in a probabilistic (hash-based) filter. To determine whether a flow attribute set with a connection error has previously been observed for the destination DCN, the resource-based filter first queries its LRU cache followed by the probabilistic filter. If no matching record is found, then the flow attribute set passes through the filter and is considered by the port scanner analysis, while a new record for that flow attribute set is added to the LRU cache. Based on certain policies, the LRU cache might shrink to accommodate more data in the probabilistic filter.

In some embodiments, data can also be evicted from the probabilistic filters based on policies specified at the time of instantiation (e.g., to drop the oldest data). Because entries are eventually evicted from the filter, a source could be penalized multiple times for the same flow, but this would cause a new entry to be added into the filter so such double counting will occur very infrequently. The use of a probabilistic filter can lead to very occasional false positives (i.e., exclusion of flow attribute sets that are actually new flow attribute sets), but this will occur infrequently enough to have a minimal effect on the port scanner detection and is outweighed by the benefits of avoiding misclassifying misconfigured DCNs.

Figure 8:
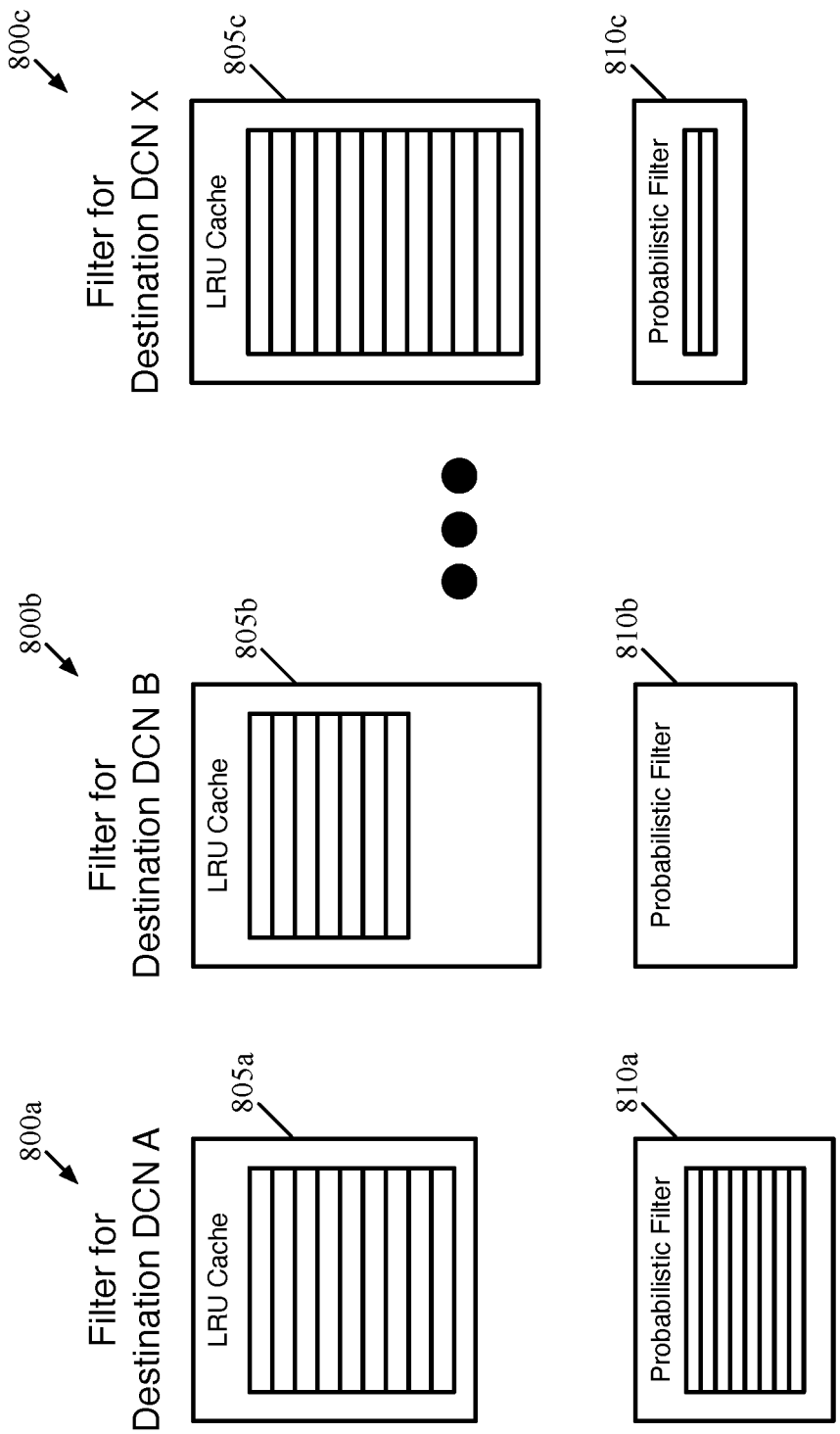
FIG. 8 conceptually illustrates resource-based filters instantiated for each of multiple DCNs in a datacenter in order to track flow attribute sets with connection errors for flows sent to each of these DCNs.

FIG. 8 conceptually illustrates resource-based filters 800a-c instantiated for each of multiple DCNs in a datacenter in order to track flow attribute sets with connection errors for flows sent to each of these DCNs. As shown, each of these filters includes a respective LRU cache 805a-c and a probabilistic filter 810a-c (e.g., a bloom filter, cuckoo filter, etc.). The LRU caches 805a-c can vary in size, depending on the memory requirements and the usage of each. For instance, the LRU cache 805a for destination DCN A has been reduced in size compared to the LRU cache 805c for destination DCN X, in order to accommodate more memory for the probabilistic filter 810a. Meanwhile, destination DCN B has not received as many flows with connection errors and, as a result, its LRU cache 805b has not filled up enough to require the use of its respective probabilistic filter 810b.

Finally, returning again to FIG. 6, the process 600 aggregates (at 630) the remaining flow attribute sets by source to generate aggregated sets that indicate the number of flows with connection errors for each source. This aggregation operation of some embodiments is described in detail above by reference to FIGS. 3 and 4. The process 600 then ends (in some embodiments, the analysis appliance performs the remainder of the process 400).

As mentioned, the analysis appliance of some embodiments detects both slow port scans and vertical port scans (i.e., port scans aimed at a single destination DCN to detect open ports on that DCN). To detect vertical port scans, the analysis appliance of some embodiments analyzes data received from individual host computers in the datacenter (i.e., to determine whether a particular DCN is the target of such a scan). Such vertical port scans often use spoofed network addresses or otherwise change the source network address, so analyzing based on the source address is not a fruitful method of detection. Instead, the analysis appliance analyzes the port usage over a particular time period (e.g., one day) for each DCN to determine whether that port usage deviates from a historical baseline port usage (e.g., over the previous 30 days) for that DCN in a way that is indicative of the DCN being targeted by a vertical port scan.

Figure 9:
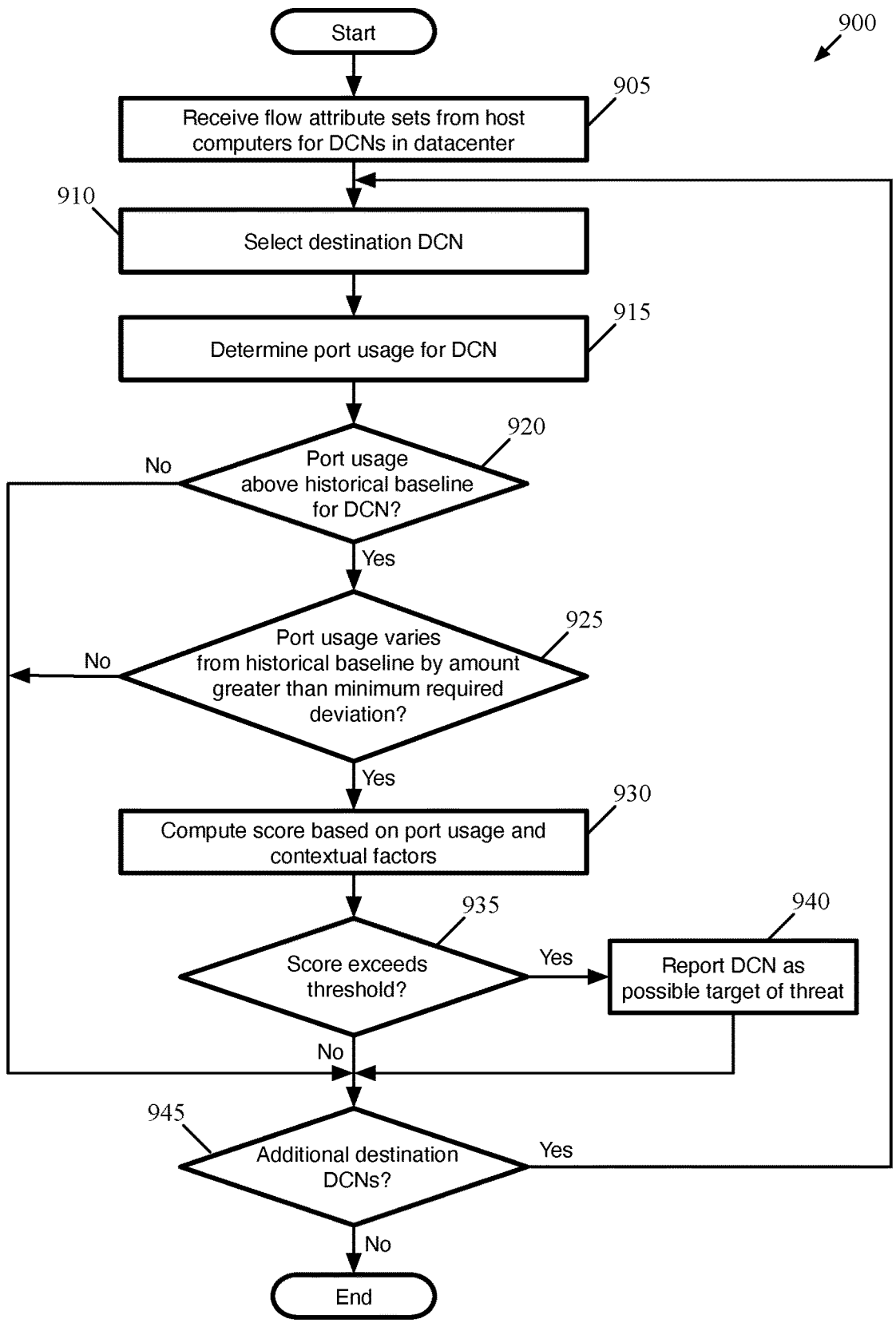
FIG. 9 conceptually illustrates a process of some embodiments for identifying destination DCNs in a datacenter that are targets of vertical port scans.

FIG. 9 conceptually illustrates a process 900 of some embodiments for identifying destination DCNs in a datacenter that are targets of vertical port scans. The process 900 is performed, in some embodiments, by an anomaly detector in the analysis appliance (e.g., the port scan detection module 170 of the anomaly detector 150 shown in FIG. 1). In other embodiments, the process 900 is performed by the anomaly processing engine 132, as this process is not performed in the same real-time or near-real-time manner as the slow port scan detection. Instead, the vertical port scan detection process of some embodiments is performed (whether by the anomaly detector, anomaly processing engine, or another module) after the conclusion of a longer time period (e.g., each day). The process 900 will be described in part by reference to FIGS. 10-12, which respectively illustrate different examples of port usage over time as well as a graphical user interface showing port usage over time.

As shown, the process 900 begins by receiving (at 905) flow attribute sets from host computers for DCNs in the datacenter. As described above, the flow exporters on each of the host computers (or a subset of host computers that execute DCNs relevant to analysis appliance) provide the flow attribute sets to the analysis appliance, which correlates the flow attribute sets. In some embodiments, the analysis appliance correlates these flow attribute sets and stores them in a time series database for use by anomaly detection modules (e.g., the anomaly processing engine). This allows the analysis appliance to review the flow attribute sets at regular intervals (e.g., once per day) to perform vertical port scan analysis.

In some embodiments, the analysis appliance will have, at this point, calculated various statistics for the baseline historical port usage of each destination DCN. The analysis appliance monitors network flows for a period of time (e.g., one week, 30 days, 100 days, etc.) to determine usage patterns and baselines. This training period generally includes numerous instances of the time period for analysis. For instance, if the vertical port scan analysis looks at port usage for one day compared to a historical baseline, the training period should be many days long.

During this training period, the analysis appliance calculates the average (i.e., the mean) number of ports used for each DCN during the time period used for later analysis (e.g., each day). Port usage for a particular DCN here refers to the number of transport layer port numbers used for incoming connections to the particular DCN during the time period. Some embodiments also determine the standard deviation from this mean during the baseline time period, the median number of ports used, and/or the median absolute deviation. Using the median and median absolute deviation helps to account for outlier time periods (e.g., days during which there is a spike in port usage or dramatically less port usage for external reasons such as major holidays).

The process 900 selects (at 910) a destination DCN to analyze as a potential target of a vertical port scan. In some embodiments, each DCN in the datacenter (or each DCN in a particular subset) is analyzed as a potential target by the process. It should be understood that the process 900 is a conceptual process, and that the actual operation may vary. For example, while this process shows each destination DCN being analyzed serially, some embodiments perform this analysis for multiple DCNs in parallel.

The process 900 determines (at 915) the port usage for the selected DCN during the current time period for analysis (e.g., the most recent time period). As mentioned, in some embodiments the port usage specifies the number of different transport layer ports used for incoming connections during the most recent time period. Some embodiments also update the historical baseline port usage based on the most recent baseline period. For instance, if the initial baseline training period is 30 days, some embodiments update the baseline each day to either include the port usage for the entire training period plus the port usage for all of the days since then, or to include only the most recent 30 days. Thus, the process updates the mean, standard deviation, median, and median absolute deviation, in some embodiments.

The process 900, as described below, calculates scores for some of these destination DCNs to determine whether they should be reported as the target of a threat. Rather than calculate scores for all DCNs in some embodiments the vertical port scan detection process uses simplistic gating techniques to quickly eliminate some (possibly many) of the DCNs in the datacenter. First, the process 900 determines (at 920) whether the port usage is above the historical baseline average for the destination DCN. If the port usage is below or equal to the average port usage for the DCN, then the odds that this DCN was the target of a port scan are low. Different embodiments may use the mean or the median port usage for this determination.

If the port usage is above the historical baseline for the DCN, the process 900 also determines (at 925) whether the port usage varies from the historical baseline by an amount greater than the minimum required deviation. For this determination, some embodiments use the standard deviation or a multiple thereof during the historical baseline period as the minimum required deviation. That is, in some embodiments, if the port usage is more than one standard deviation greater than usual, the vertical port scan detection process continues to analyze the DCN as a potential target of a port scan. Other embodiments use the median absolute deviation during the historical baseline period and determine whether the port usage varies by more than this deviation instead. In either case, if the port usage is either below the historical baseline or only above the historical baseline by a small amount, the process 900 concludes its analysis of the currently selected DCN and proceeds to 945.

On the other hand, if the port usage is above the historical baseline by a significant amount, the process 900 computes (at 930) a score for the DCN based on the port usage as well as a set of contextual factors. These contextual factors enable the score to better account for context beyond just the total number of different ports used. Examples of contextual factors include the usage of unique ports that were not used during the historical baseline period as well as the number of connection errors detected for flows sent to the DCN (or a metric derived from this, such as the number of connection errors per port used). The usage of unique ports that were not used previously is an indicator that a spike in port usage is in fact due to a port scanner as compared to simply a spike in genuine attempts to contact the DCN. In addition, as described in detail above, the existence of connection errors (e.g., incomplete TCP handshakes and/or ICMP errors) is often evidence of a port scanner attempting to contact a DCN.

In some embodiments, the threat likelihood score is computed by aggregating these multiple factors with different adjustable weights. That is, the score is a weighted sum of the different factors. The weights, which specify the relative importance of the different factors, can be set by the network administrator. An example equation could be along the lines of $$w_1\sigma + w_2 N_U + w_3 N_E,$$

Where $\sigma$ is a deviation measurement (e.g., the number of standard deviations the port usage for the time period is above its baseline), $N_U$ is the number of unique ports used that were not used during the historical baseline time period, $N_E$ is a measurement of the number of connection errors or number of flows with connection errors (e.g., the ratio of the number of connection errors to the total number of ports used), and $w_i$ are the weights.

These weights can be set by a network administrator or initialized to default values in some embodiments. In addition, based on feedback (e.g., from network administrator), the analysis appliance can modify the weights in some embodiments. For instance, if the process 900 identifies a DCN targeted by a port scan and the administrator affirms this conclusion, then the weights might be modified so that the inputs would generate a higher score. As an example, if the number of connection errors was low, then the weight for that factor could be decreased with the other weights being correspondingly increased. Similarly, if an administrator dismisses a threat, then the weights might be modified so that the inputs would generate a lower score. Thus, if the absolute port usage was large but the other contextual factors were smaller, then an administrator dismissing the resulting threat reporting could result in the weights for the contextual factors increasing with a corresponding decrease in the port usage deviation factor.

Figure 10:
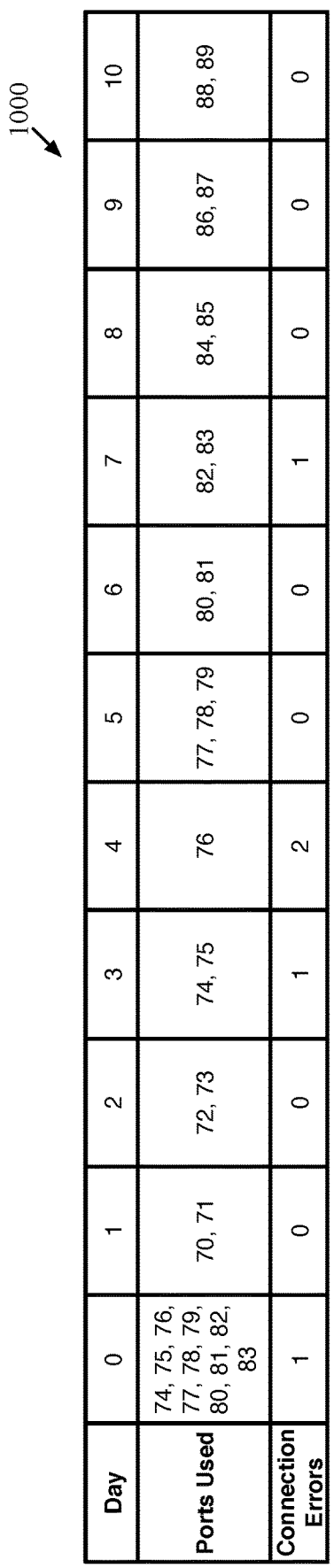
FIGS. 10 and 11 illustrate two examples of port usage for a DCN over 11-day periods.
Figure 11:
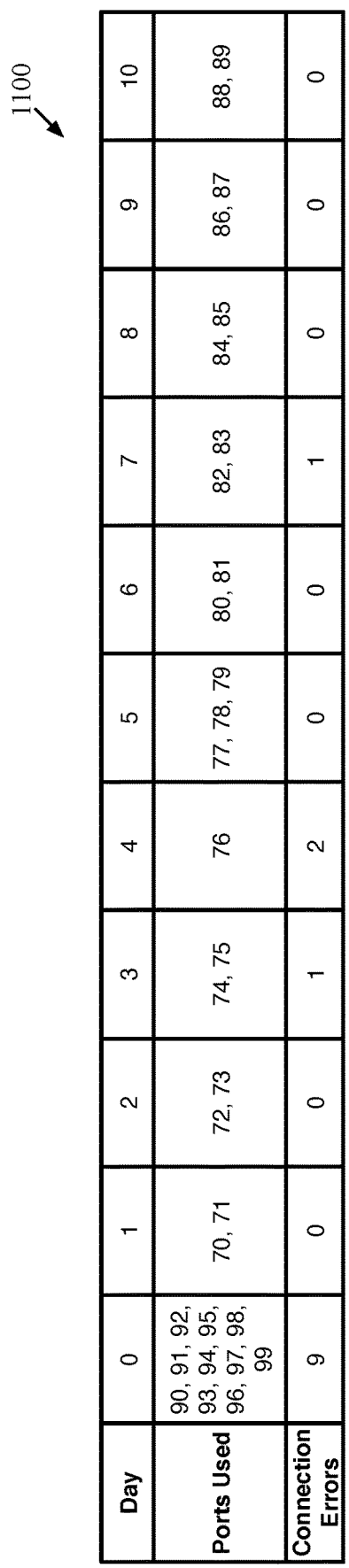

FIGS. 10 and 11 illustrate two examples of port usage 1000 and 1100 for a DCN over 11-day periods. In both of these examples, days 1-10 represent the previous 10 days used as the historical baseline period, and day 0 represents the time period being analyzed. In both examples, two ports are used each day during the historical baseline period, and 10 ports are used (a significant increase) during the current time period. However, the contextual factors are different between the two examples. In the first port usage example 1000, none of the ports used during the current time period are unique ports that were not previously used. On the other hand, in the second port usage example 1100, all of the ports used during the current time period are unique ports that were not previously used. In addition, only 1 connection error was identified in the first example while 9 connection errors were identified in the second example. As such, the security threat likelihood score will be significantly higher in the second example.

Returning to FIG. 9, the process 900 then determines (at 935) whether the score computed for the DCN exceeds a threshold for determining that the DCN is a likely target of a vertical port scan attack. In some embodiments, this threshold is set by a network administrator (e.g., when configuring the analysis appliance).

If the score exceeds this threshold, the process 900 reports (at 940) as a possible target of a vertical port scanner threat. In some embodiments, this report is provided via a graphical user interface for the analysis appliance (e.g., generated by the visualization engine). The report identifies the DCN affected as well as the relevant statistics that allow the network administrator to evaluate whether any action should be taken (e.g., shutting down the DCN, imposing specific firewall rules, etc.).

Figure 12:
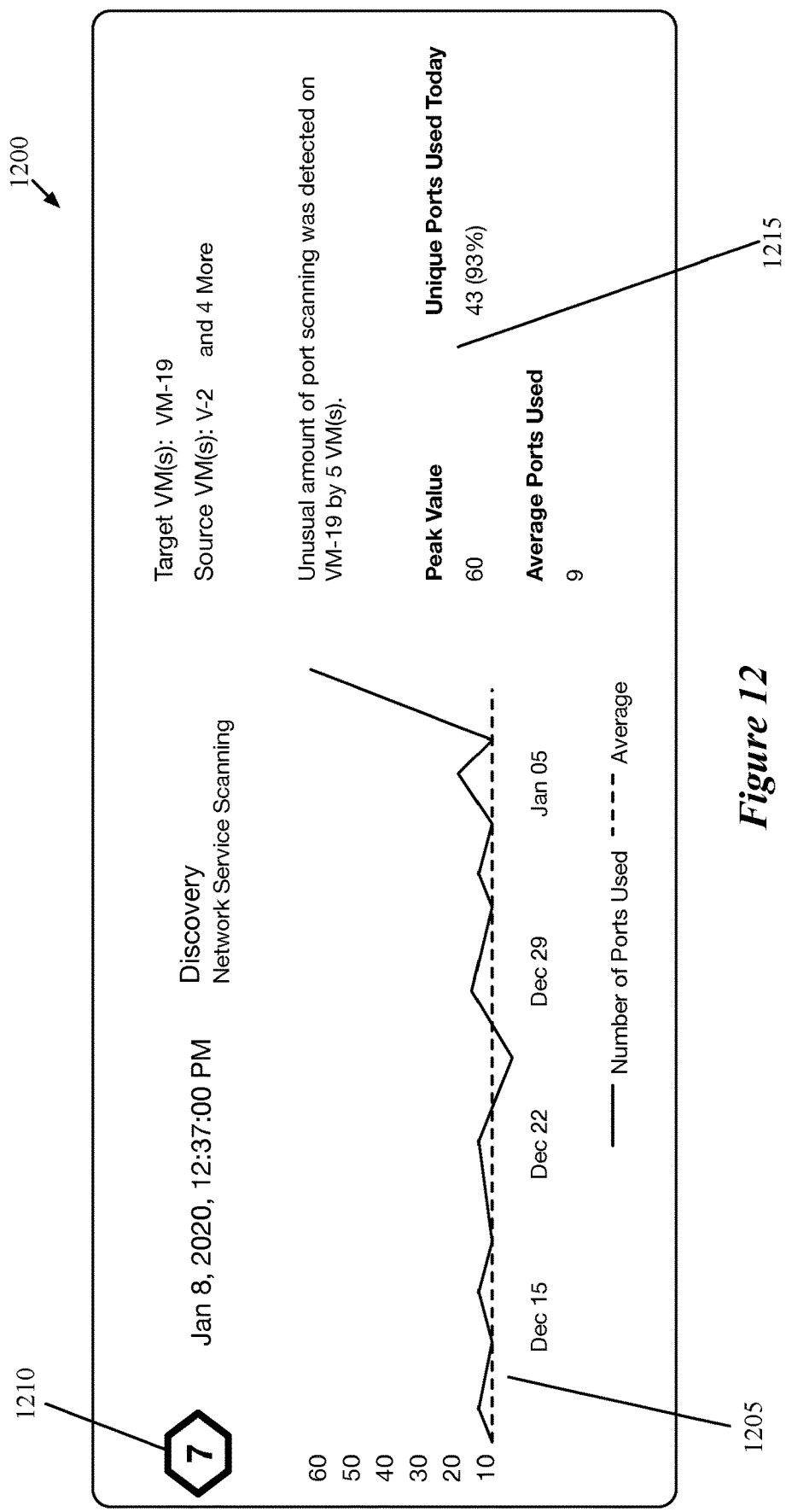
FIG. 12 illustrates an example graphical user interface (GUI) showing information about port usage in a VM suspected of being the target of a vertical port scan.

FIG. 12 illustrates an example graphical user interface (GUI) 1200 (or portion of a GUI) showing information about a port usage in a VM suspected of being the target of a vertical port scan. This GUI 1200 includes a graph of port usage 1205 as well as a port scan likelihood score 1210 and additional information 1215. In this case, the graph 1205 shows the port usage per day over a 30-day period, with a spike in usage the previous day. The score 1210 is highlighted (e.g., using a different color) to indicate that the destination DCN might be the target of a port scanner. In this case, a score of 7 is higher than the threshold for reporting the DCN as a likely target. The additional information 1215 indicates the name of the target VM (i.e., the destination DCN), the name of (in this case multiple) source VMs (though external sources could also be included), the peak number of ports used (60, occurring the previous day), the average number of ports used (9), and the number of unique ports used in the previous day (43). This information also provides a notification that an unusual amount of port scanning was detected on this VM.

After concluding the evaluation for the currently selected DCN, the process 900 determines (at 945) whether additional destination DCNs remain to be evaluated as possible port scanning targets. If additional DCNs remain, the process 900 returns to 910 to select the next DCN and determine whether that DCN is a likely port scanner target. Once all of the destination DCNs have been evaluated for the most recent time period, the process 900 ends.

Figure 13:
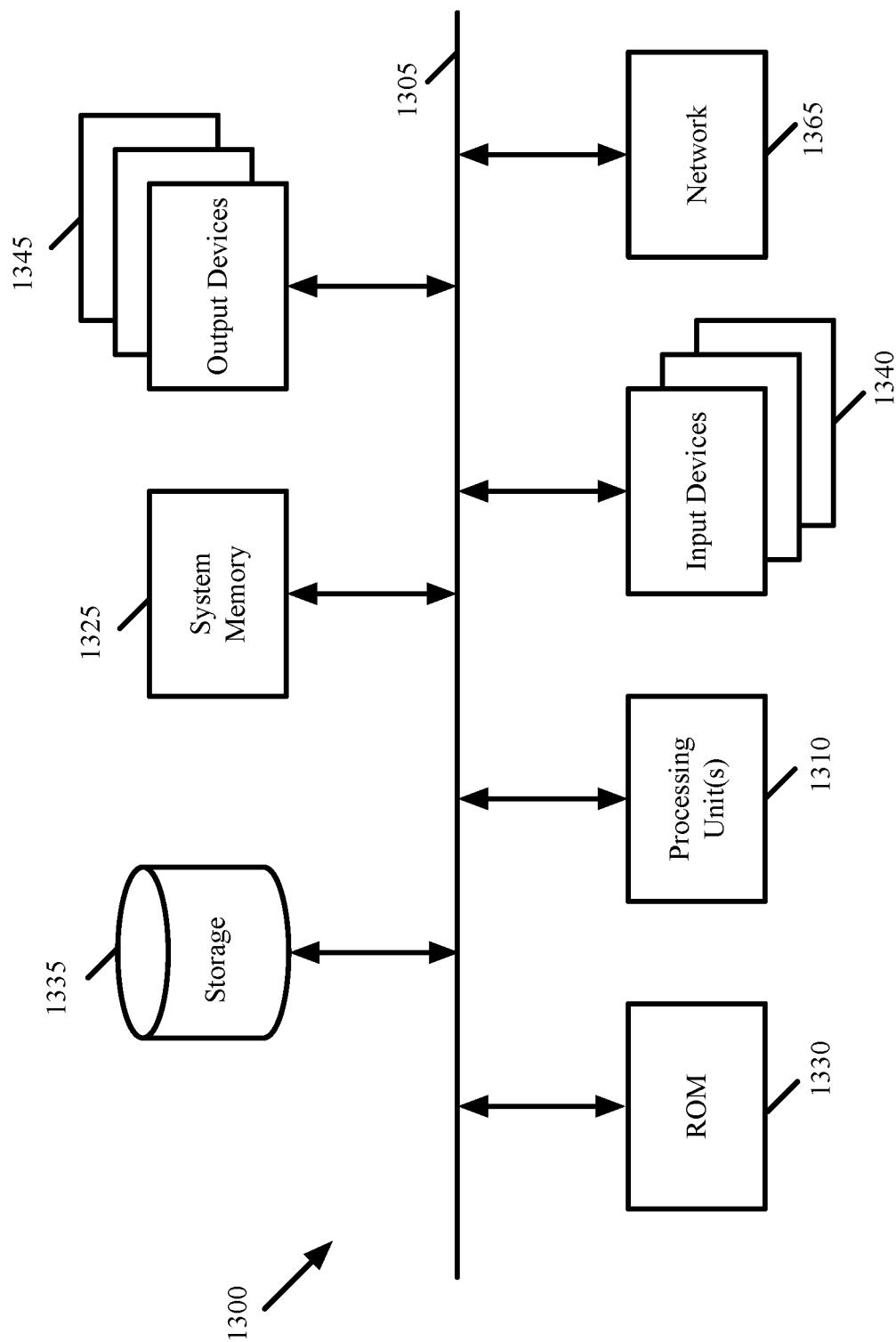
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random-access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 6, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for identifying malicious actors performing port scans in a datacenter, the method comprising:

from a plurality of host computers in the datacenter, receiving attribute sets for a plurality of flows, each respective attribute set for a respective flow comprising at least (i) a source identifier for the respective flow and (ii) an indicator as to the respective flow is indicative of the source of the respective flow performing a port scan across data compute nodes (DCNs) operating in the datacenter;

for each of a plurality of source identifiers, aggregating the received attribute sets to generate an aggregate attribute set for the source identifier that specifies a number of flows sent by the source during a particular time window that are indicative of the source performing a port scan across DCNs operating in the datacenter; and for each source identifier of a set of the source identifiers, adjusting an existing security threat likelihood score for the source corresponding to the source identifier by:

in response to detecting no flows indicative of the source performing a port scan are sent by the source during the particular time window, using a first equation that reduces the existing security threat likelihood score for the source; and in response to detecting at least one flow indicative of the source performing a port scan are sent by the source during the particular time window, using a second, different equation that increases the existing security threat likelihood score for the source:

wherein:

each of the first and second equations use (i) a first probability that a flow initiated by a port scanner will not be indicative of its source performing a port scan and (ii) a second probability that a flow initiated by a non-malicious source will not be indicative of its source performing a port scan;

the first equation scales the existing security threat likelihood score for a first source by a ratio of the first probability to the second probability; and the second equation scales the existing security threat likelihood score for a second source by (i) the number of flows sent by the second source during a particular time window that are indicative of the second source performing a port scan and (ii) a ratio of a probability that a flow initiated by a port scanner will be indicative of its source performing a port scan and to a probability that a flow initiated by a non-malicious source will be indicative of its source performing a port scan.

2. The method of claim 1, wherein the source identifier for each flow is a source network address of the flow.

3. The method of claim 1, wherein the second equation adjusts the existing security threat likelihood score by an amount based on the number of flows for the source identifier that comprise an indicator that the respective flow is indicative of the source performing a port scan.

4. The method of claim 1, wherein the existing security threat likelihood score for a particular source is not adjusted if the received attribute sets do not include any attribute sets for flows comprising the source identifier corresponding to the particular source.

5. The method of claim 1, wherein aggregating the received attribute sets comprises aggregating attribute sets received from the plurality of host computers over the particular time window.

6. The method of claim 1, wherein each respective attribute set for a respective flow comprises at least a source network address, a destination network address, a destination port, a protocol, and a number of connection errors detected.

7. The method of claim 6, wherein the number of connection errors detected is the indicator as to whether the respective flow is indicative of the source of the respective flow performing a port scan across DCNs operating in the datacenter.

8. The method of claim 6, wherein the connection errors comprise (i) indications of incomplete handshakes for transmission control protocol (TCP) flows and (ii) internet control message protocol (ICMP) errors for user datagram protocol (UDP) flows.

9. The method of claim 6, wherein aggregating the received attribute sets for a particular source identifier comprises determining a number of flows for the particular source with at least one connection error.

10. The method of claim 9, wherein:
each destination network address is associated with a particular DCN executing in the datacenter; and
the method further comprises, prior to determining the number of flows for the particular source with at least one connection error, discarding from consideration flows directed to specific ports of at least a subset of the DCNs.

11. The method of claim 10, wherein the specific ports for each DCN in the subset of DCNs comprise ports identified as being open on the DCN such that flows sent to the specific ports are not indicative of the source performing a port scan.

12. The method of claim 11, wherein the open ports for each of the DCNs are identified based on analysis of the flow attribute sets received from the plurality of host computers over a period of time.

13. The method of claim 6 further comprising, prior to aggregating the received attribute sets, eliminating attribute sets that have the same destination network address, destination port, and protocol as previously-aggregated attribute sets with connection errors.

14. The method of claim 13, wherein eliminating said attribute sets comprises using a probabilistic filter.

15. A non-transitory machine-readable medium storing a program which when executed by at least one processing unit identifies malicious actors performing port scans in a datacenter, the program comprising sets of instructions for:
receiving, from a plurality of host computers in the datacenter, attribute sets for a plurality of flows, each respective attribute set for a respective flow comprising at least (i) a source identifier for the respective flow and (ii) an indicator as to the respective flow is indicative of the source of the respective flow performing a port scan across data compute nodes (DCNs) operating in the datacenter;
for each of a plurality of source identifiers, aggregating the received attribute sets to generate an aggregate attribute set for the source identifier that specifies a number of flows sent by the source during a particular time window that are indicative of the source performing a port scan across DCNs operating in the datacenter; and
for each source identifier of a set of the source identifiers, adjusting an existing security threat likelihood score for the source corresponding to the source identifier by:
in response to detecting no flows indicative of the source performing a port scan are sent by the source during the particular time window, using a first equation that reduces the existing security threat likelihood score for the source; and
in response to detecting at least one flow indicative of the source performing a port scan are sent by the source during the particular time window, using a second, different equation that increases the existing security threat likelihood score for the source:
wherein:
each of the first and second equations use (i) a first probability that a flow initiated by a port scanner will not be indicative of its source performing a port scan and (ii) a second probability that a flow initiated by a non-malicious source will not be indicative of its source performing a port scan;
the first equation scales the existing security threat likelihood score for a first source by a ratio of the first probability to the second probability; and
the second equation scales the existing security threat likelihood score for a second source by (i) the number of flows sent by the second source during a particular time window that are indicative of the second source performing a port scan and (ii) a ratio of a probability that a flow initiated by a port scanner will be indicative of its source performing a port scan and to a probability that a flow initiated by a non-malicious source will be indicative of its source performing a port scan.

16. The non-transitory machine-readable medium of claim 15, wherein the program further comprises a set of instructions for reporting a first source as a likely port scanner when the security threat likelihood score for the first source crosses a first threshold after adjusting the security threat likelihood score for the first source using the second equation.

17. The non-transitory machine-readable medium of claim 16, wherein the program further comprises sets of instructions for:
reporting a second source as a likely safe source of data flows when the security threat likelihood score for the second source crosses a second threshold after adjusting the security threat likelihood score for the second source using the second equation; and
stopping tracking of the security threat likelihood score for a particular source to save memory when the security threat likelihood score for the particular source crosses either of the first and second thresholds.

18. The non-transitory machine-readable medium of claim 15, wherein the security threat likelihood score for a particular source measures a likelihood that the particular source is a port scanner.

19. The non-transitory machine-readable medium of claim 15, wherein the program is an analysis appliance that performs a plurality of analysis operations on the received attribute sets from the plurality of host computers.

20. The non-transitory machine-readable medium of claim 15, wherein:
the second equation adjusts the existing security threat likelihood score by an amount based on the number of flows for the source identifier that comprise an indicator that the respective flow is indicative of the source performing a port scan; and the existing security threat likelihood score for a particular source is not adjusted if the received attribute sets do not include any attribute sets for flows comprising the source identifier corresponding to the particular source.

21. The non-transitory machine-readable medium of claim 15, wherein:

each respective attribute set for a respective flow comprises at least a source network address, a destination network address, a destination port, a protocol, and a number of connection errors detected; and the number of connection errors detected is the indicator as to whether the respective flow is indicative of the source of the respective flow performing a port scan across DCNs operating in the datacenter.

22. The non-transitory machine-readable medium of claim 21, wherein the connection errors comprise (i) indications of incomplete handshakes for transmission control protocol (TCP) flows and (ii) internet control message protocol (ICMP) errors for user datagram protocol (UDP) flows.

\* \* \* \* \*